United States Patent
Chen et al.

(10) Patent No.: US 9,992,784 B2
(45) Date of Patent: Jun. 5, 2018

(54) BASE STATION FREQUENCY RESOURCE ALLOCATION METHOD AND NETWORK DEVICE

(71) Applicant: China Academy of Telecommunications Technology, Beijing (CN)

(72) Inventors: Li Chen, Beijing (CN); Fei Qin, Beijing (CN); Yuan He, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days. days.

(21) Appl. No.: 15/122,105

(22) PCT Filed: Feb. 16, 2015

(86) PCT No.: PCT/CN2015/073154
§ 371 (c)(1),
(2) Date: Jan. 8, 2017

(87) PCT Pub. No.: WO2015/127880
PCT Pub. Date: Sep. 3, 2015

(65) Prior Publication Data
US 2017/0111914 A1    Apr. 20, 2017

(30) Foreign Application Priority Data
Feb. 28, 2014  (CN) .......................... 2014 1 0073301

(51) Int. Cl.
*H04W 72/10* (2009.01)
*H04W 72/08* (2009.01)
*H04W 72/04* (2009.01)

(52) U.S. Cl.
CPC ......... *H04W 72/10* (2013.01); *H04W 72/082* (2013.01); *H04W 72/0453* (2013.01)

(58) Field of Classification Search
CPC ............... H04W 72/10; H04W 72/082; H04W 72/0453
See application file for complete search history.

(56) References Cited

U.S. PATENT DOCUMENTS

| 5,768,687 A | 6/1998 | Marzoug | |
|---|---|---|---|
| 2006/0073833 A1* | 4/2006 | Hamalainen | H04W 16/02 455/447 |

(Continued)

FOREIGN PATENT DOCUMENTS

| CN | 1413035 A | 4/2003 |
|---|---|---|
| CN | 1675957 A | 9/2005 |

(Continued)

OTHER PUBLICATIONS

NEC; Views on interference coordination for semi-static small cell on/off; 3GPP TSG RAN WG1 Meeting #76, R1-140419; Feb. 14, 2014; 2 pages.

(Continued)

*Primary Examiner* — Duc C Ho
(74) *Attorney, Agent, or Firm* — Kilpatrick Townsend & Stockton LLP

(57) ABSTRACT

Disclosed is a base station frequency resource allocation method, for achieving proper allocation of base station frequency resources to avoid or reduce inter-cell interference. The method comprises: determining each basic frequency resource in each allowed operating band conforming to selectable operating bandwidth of a cell; determining a frequency priority coefficient of each basic frequency resource, the frequency priority coefficient representing interference from each neighboring cell that is adjacent to the cell in location with the cell in the basic frequency resource, and/or load of each neighboring cell in the basic frequency resource; and allocating frequency resources to the cell according to the frequency priority coefficients of the (Continued)

basic frequency resources. Also disclosed is a network device.

20 Claims, 9 Drawing Sheets

(56) References Cited

U.S. PATENT DOCUMENTS

| | | | | |
|---|---|---|---|---|
| 2012/0263067 | A1* | 10/2012 | Kim | H04W 72/082 370/252 |
| 2013/0005380 | A1 | 1/2013 | Nobukiyo | |
| 2013/0258869 | A1* | 10/2013 | Zhou | H04W 52/40 370/252 |

FOREIGN PATENT DOCUMENTS

| | | |
|---|---|---|
| CN | 101212763 A | 7/2007 |
| CN | 101076181 A | 11/2007 |
| CN | 101146330 A | 3/2008 |
| CN | 101242640 A | 8/2008 |
| CN | 101668294 A | 3/2010 |
| CN | 101686512 A | 3/2010 |
| CN | 101998412 A | 3/2011 |
| CN | 102340778 A | 2/2012 |
| CN | 102387531 A | 3/2012 |
| CN | 102413477 A | 4/2012 |
| CN | 102413499 A | 4/2012 |
| CN | 102469461 A | 5/2012 |
| CN | 103517277 A | 1/2014 |
| CN | 103813347 A | 5/2014 |
| EP | 2879320 A1 | 6/2015 |
| WO | 2013043093 A1 | 3/2013 |

OTHER PUBLICATIONS

Translation of International Search Report corresponding to PCT/CN2015/073154, dated Feb. 16, 2015.

* cited by examiner

—Prior Art—

—Prior Art—

--Prior Art--

BASE STATION FREQUENCY RESOURCE ALLOCATION METHOD AND NETWORK DEVICE

This application is National Stage of International Application No. PCT/CN2015/073154, filed on Feb. 16, 2015 which claims priority to Chinese Patent Application No. 201410073301.7, filed with the Chinese Patent Office on Feb. 28, 2014 and entitled "Method and network device for configuring frequency resources of a base station", both of which are hereby incorporated by reference in their entireties.

FIELD

The present invention relates to the field of communications, and particularly to a method and network device for configuring frequency resources of a base station.

BACKGROUND

In wireless communication systems, a signal propagates through a wireless environment, and in a case of a number of access points are deployed (e.g., base stations in a cellular network, Access Points (APs) in a Wireless Local Area Network (WLAN) system, etc.), then if the adjacent access points operate at the same frequency, then interference between adjacent cells will occur in the majority of the systems (e.g., an Orthogonal Frequency Division Multiplexing (OFDM) system, a Code Division Multiple Access (CDMA) system, etc.), so that spectrum resources may be underutilized, thus reducing transmission performance of the wireless systems.

Taking the OFDM system as an example, a Long Term Evolution (LTE) system is a $4^{th}$-Generation (4G) wireless communication system based upon the OFDM technology in which a base station allocates time-frequency resources over different sub-carriers for terminals to transmit service data signals without any interference between subscribers in a cell, but if different cells operate over the same frequency resource, then inter-cell interference will occur. Taking a Time Division-Long Term Evolution (TD-LTE) system as an example, uplink and downlink transmission in a cell in the TD-LTE system operates at the same frequency, thus making the problem of interference more pronounced.

There may be two categories of inter-cell interference (four types of inter-cell interference in total) in a multi-cell Time Division Duplex (TDD) network. The first category of inter-cell interference occurs in sub-frames with the same transmission direction in adjacent cells as illustrated in FIG. 1a and FIG. 1b, where interference to downlink reception at a User Equipment (UE) in the present cell due to downlink transmission from a base station in an adjacent cell is referred to type-1 interference; and interference to uplink reception at a base station in the present cell due to uplink transmission from a UE in the adjacent cell is referred to as type-2 interface. The first category of inter-cell interference occurs in both of the TDD and FDD systems, and is general adjacent-cell interference.

The second category of inter-cell interference occurs in sub-frames with different transmission directions in adjacent cells. As illustrated in FIG. 2, when there is concurrent transmission in a different direction in the adjacent cell, uplink reception at the base station in the current cell may be subject to interference from a downlink transmission signal of the base station in the adjacent cell, which is referred to as type-3 interference; and also downlink reception at the UE in the adjacent cell may be subject to interference from an uplink transmission signal of the UE in the present cell, which is referred to as type-4 interference. The second category of inter-cell interference may only occur in the TDD system, and particularly if uplink and downlink resources are configured flexibly for the adjacent TDD cell, then the second category of inter-cell interference will also be referred to as cross-timeslot interference in the TDD system.

In the technology of Inter-Cell interference Coordination (ICIC) in the existing LTE system, the base station and an adjacent base station exchange load indication and high-interference indication information of the adjacent base stations with each other, and interference is coordinated between the cells served by the base stations in a distributed coordination mode in such a way that if there is a high load and serious interference in the cell1, then center subscribers in the adjacent cell2 will access all the frequency resources in the cell, and less resources will be allocated for edge subscribers, or the edge subscribers will access a part of the resources, so that signals of the subscribers in the cell1 can be transmitted. However information in the ICIC technology in the LIE system is exchanged roughly, and the resources are not coordinated between the base stations in a real-time manner; and both existing simulations and applications have demonstrated that the effect of the ICIC technology may not be satisfactory for interference coordination between the cells to improve the capacity of the system.

At present, mobile communication become increasingly popular so that there are a dramatically increasing number of mobile subscribers, and an explosively growing demand for traffic of mobile services. In view of the development trend at present, traffic will be increased by a factor of 1000, the number of connected devices will be increased by 100, and there will be a peak rate of 10 Gbps, all of which are capacity demands as proposed for the 5G mobile communication system being studied. In order to satisfy these demands, inter-cell interference shall be minimized while the cells are deployed densely in the wireless communication systems to thereby guarantee the performance of the system.

If cells are deployed densely, then this scenario will be characterized in that there is a small radius of the cells, center subscribers may not be distinguished obviously from edge subscribers, and all the subscribers may suffer from inter-cell interference; the cells are deployed so densely that there is no a direct interface for all cells for signaling transmission and the cells are deployed so densely that there are a large number of cells involved in inter-cell interference coordination. The problem of inter-cell interference in the scenario where the cells are deployed densely may become more pronounced and serious than that in the macro network deployment scenario, and if signaling is exchanged in a distributed mode, then a large amount of signaling will be transmitted, thus overloading the inter-cell interfaces; and such a large number of nodes are involved that the effect of the distributed interference coordination algorithm may not be satisfactory.

SUMMARY

The invention provides a method for configuring frequency resources of a base station so as to configure reasonably the frequency resources of the base station to thereby avoid or alleviate inter-cell interference.

Particular technical solutions according to embodiments of the invention are as follows:

A method for configuring frequency resources of a base station includes:

determining respective elementary frequency resources in respective allowable operating bands satisfying an optional operating bandwidth, of a cell;

determining a frequency priority coefficient of each elementary frequency resource, wherein the frequency priority coefficient characterizes interference for the cell, from respective adjacent cells adjacent in position to the cell in the elementary frequency resource, and/or loads of the respective adjacent cells in the elementary frequency resource; and allocating a frequency resource for the cell according to the frequency priority coefficients of the elementary frequency resources.

Wherein determining the frequency priority coefficient of each elementary frequency resource may include:

determining the interference to the cell from the respective adjacent cells in the elementary frequency resource, and/or the loads of the adjacent cells in the elementary frequency resource; and calculating single-cell frequency priority coefficients of the respective adjacent cells for the cell according to the interference to the cell from the adjacent cells in the elementary frequency resource, and/or the loads of the adjacent cells in the elementary frequency resource, and calculating the frequency priority coefficient of the elementary frequency resource according to the single-cell frequency priority coefficients of the respective adjacent cells for the cell, wherein the single-cell frequency priority coefficient characterizes interference to the cell from a single adjacent cell in the elementary frequency resource, and/or a load of the single adjacent cell in the elementary frequency resource.

Wherein calculating the single-cell frequency priority coefficients of the respective adjacent cells for the cell, and calculating the frequency priority coefficient of the elementary frequency resource according to the single-cell frequency priority coefficients of the respective adjacent cells for the cell may include:

for each adjacent cell, calculating the single-cell frequency priority coefficient of the each adjacent cell for the cell as the sum of the product of a first weight factor and the load of the each adjacent cell in the elementary frequency resource, and the product of a second weight factor and the interference to the cell from the each adjacent cell in the elementary frequency resource; and calculating the frequency priority coefficient $I_{Rseg}$ of the elementary frequency resource as the weighted sum of the single-cell frequency priority coefficients of the respective adjacent cells for the cell.

Preferably the sum of the first weight factor and the second weight factor is 1;

the interference to the cell from the adjacent cells in the elementary frequency resource is the ratios of an interference measure value of the adjacent cell for the cell to the quantified largest interference value, wherein the interference measure value of the adjacent cell for the cell is a measure strength value of Reference Signal Received Power (RSRP) or other reference signals of the adjacent cell, which is measured in the cell; and the loads of the adjacent cells in the elementary frequency resource range from 0 to 1, wherein "0" indicates that none of resources of the adjacent cells is occupied, and "1" indicates that all the resources of the adjacent cells are occupied.

Further to any one of the embodiments above of the method, preferably a frequency resource is allocated for the cell according to the frequency priority coefficients of the elementary frequency resources so that the allocated frequency resource is orthogonal to frequency resources of the respective adjacent cells; or a frequency resource is allocated for the cell according to the frequency priority coefficients of the elementary frequency resources so that a central frequency of the allocated frequency resource does not overlap with central frequencies of frequency resources of the respective adjacent cells; or a frequency resource is allocated for the cell according to the frequency priority coefficients of the elementary frequency resources so that there is the lowest interference and/or the lowest load of the allocated frequency resource.

In order to enable the allocated frequency resources to be orthogonal to the frequency resources of the respective adjacent cells, determining the frequency priority coefficient of each elementary frequency resource in an implementation may include:

determining the interference of the adjacent cells for the cell in the elementary frequency resource as the single-cell frequency priority coefficients of the adjacent cells for the cell; and calculating the frequency priority coefficient $I_{Rseg}$ of the elementary frequency resource as the sum of the single-cell frequency priority coefficient of the respective adjacent cells.

Further to this, allocating a frequency resource for the cell according to the frequency priority coefficients of the elementary frequency resources may include:

searching the respective allowable operating bands satisfying the optional operating bandwidth, of the cell one by one for such an allowable operating band that the frequency priority coefficient $I_{Rseg}$ of each elementary frequency resource thereof is less than or equal to a first available frequency priority coefficient threshold $Th_{Rseg}$, and if such an allowable operating band is located, then terminating the search, and allocating the located allowable operating band for the cell, wherein the first available frequency priority coefficient threshold $Th_{Rseg}$ represents the smallest value of interference which can be indicated.

In order to enable the allocated frequency resources to be orthogonal to the frequency resources of the respective adjacent cells, determining the frequency priority coefficient of each elementary frequency resource in another implementation may include:

if the elementary frequency resource is not accessed by any one of the adjacent cells, then determining the frequency priority coefficient of the elementary frequency resource as 0; and if the elementary frequency resource is accessed by any one of the adjacent cells, then determining the frequency priority coefficient of the elementary frequency resource as 1.

Further to this, allocating a frequency resource for the cell according to the frequency priority coefficients of the elementary frequency resources may include:

searching the respective allowable operating bands satisfying the optional operating bandwidth, of the cell, one by one for such an allowable operating band that the frequency priority coefficient $I_{Rseg}$ of each elementary frequency resource thereof is equal to 0, and if such an allowable operating band is located; then terminating the search, and allocating the located allowable operating band for the cell.

Further to any one of the embodiments above of the method, allocating a frequency resource for the cell according to the frequency priority coefficients of the elementary frequency resources may include:

In order to enable the central frequency of the allocated frequency resource does not overlap with the central frequencies of the frequency resources of the respective adjacent cells, or the allocated frequency resource to have the lowest interference and/or load, the method further includes:

calculating frequency priority coefficients $I_{Band}$ of the respective allowable operating bands satisfying the optional operating band, of the cell, according to the frequency priority coefficients $I_{Rseg}$ of the elementary frequency resources.

Further to this; allocating a frequency resource for the cell according to the frequency priority coefficients of the elementary frequency resources may include: searching the respective allowable operating bands satisfying the optional operating bandwidth, of the cell, one by one for an absolutely available band, and if the absolutely available band is located, then allocating the absolutely available band for the cell; wherein the absolutely available band is such that the frequency priority coefficients $I_{Rseg}$ of the respective elementary frequency resources in the allowable operating bands are less than or equal to a preset first absolutely available frequency priority coefficient threshold $Th_{Rseg0}$, and/or the frequency priority coefficients $I_{Band}$ of the allowable operating bands are less than or equal to a preset second absolutely available frequency priority coefficient threshold $Th_0$; or allocating a frequency resource for the cell according to the frequency priority coefficients of the elementary frequency resources may include: searching the respective allowable operating bands satisfying the optional operating bandwidth, of the cell, one by one for an available band, and if an available band is located, then allocating the available band for the cell; wherein the available band is such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$; or allocating a frequency resource for the cell according to the frequency priority coefficients of the elementary frequency resources may include: traversing and searching the respective allowable operating bands satisfying the optional operating bandwidth, of the cell, for respective available bands, storing the available bands, and selecting and allocating one of the available bands for the cell according to central frequencies and bandwidths of the stored available bands; wherein the available bands are such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$.

If no absolutely available band is located, then searching the respective allowable operating bands of the cell satisfying the optional operating bandwidth one by one in an implementation may include:

traversing and searching the respective allowable operating bands satisfying the optional operating bandwidth, of the cell, for respective available bands, storing the available bands, and selecting and allocating one of the available bands for the cell according to central frequencies and bandwidths of the stored available bands;

wherein the available bands are such that the frequency priority coefficients $I_{Rseg}$ of the respective elementary frequency resources in the allowable operating bands are less than or equal to a preset first available frequency priority coefficient threshold $Th_{Rseg}$ and/or the frequency priority coefficients $I_{Band}$ of the allowable operating bands are less than or equal to a preset second available frequency priority coefficient threshold $Th_{Band}$.

If no absolutely available band is located, then searching the respective allowable operating bands satisfying the optional operating bandwidth, of the cell, one by one in another implementation may include:

searching the respective allowable operating bands satisfying the optional operating bandwidth, of the cell, one by one for an available band, and if an available band is located, then allocating the available band for the cell;

wherein the available band is such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating hands are less than or equal to a preset second available frequency priority coefficient threshold $Th_{Band}$.

Further to any one of the embodiments above of the method, before the respective allowable operating bands satisfying the optional operating bandwidth, of the cell are searched one by one, or before the respective allowable operating bands satisfying the optional operating bandwidth, of the cell are traversed, the method may further include:

if there are a number of optional operating bandwidths of the cell, then sorting the respective optional operating bandwidths of the cell in a descending order, and then selecting one of the optional operating bandwidths in the descending order.

After the frequency priority parameters $I_{Band}$ of the respective allowable operating bands satisfying the optional operating bandwidth, of the cell are calculated, allocating a frequency resource for the cell according to the frequency priority coefficients of the elementary frequency resources may include:

sorting the frequency priority coefficients $I_{Band}$ of the respective allowable operating bands satisfying the optional operating bandwidth, of the cell in according to their magnitude; and selecting the smallest one of the frequency priority coefficients $I_{Band}$ of the respective allowable operating bands, and allocating the allowable operating band corresponding to the smallest frequency priority coefficient for the cell; or determining such allowable operating bands that the differences between the frequency priority coefficients of those allowable operating bands and the smallest one of the frequency priority coefficients $I_{Band}$ of the respective allowable operating bands lie in a preset range, selecting the allowable operating band with the largest operating band among the determined respective allowable operating hands, and allocating the selected allowable operating band for the cell.

Further to this, allocating a frequency resource for the cell according to the frequency priority coefficients of the elementary frequency resources may include:

for each allowable operating bandwidth, determining the smallest one of the frequency priority coefficients $I_{Band}$ of the respective allowable operating bands satisfying the allowable operating bandwidth, and selecting the allowable operating band corresponding to the smallest frequency priority coefficient;

calculate a coefficient of each selected allowable operating band, wherein the coefficient is the product of the allowable operating bandwidth of the allowable operating band, and the frequency priority coefficient $I_{Band}$ of the allowable operating band, and an offset offset$_{Band}$ corresponding to the allowable operating bandwidth of the allowable operating band; and determining the allowable operating band corresponding to the largest one of the coefficients, and allocating the determined available band for the cell.

Further to any one of the embodiments above of the method, if the central frequency of the frequency resource allocated for the cell does not overlap with the central frequencies of the frequency resources of the respective adjacent cells, then the frequency priority coefficients $I_{Band}$ of the allowable operating bands will be $I_{Band}$=mean$(\gamma^*I_{Rseg})+P_{fcenter}$, wherein mean$(\gamma^*I_{Rseg})$ represents the weighted averages of the frequency priority coefficients of the respective elementary frequency resources in the allowable operating bands, represents a weight, and $P_{fcenter}$ represents a factor reflecting overlapping conditions of central frequencies of the allowable operating bands.

Preferably if the central frequencies of the allowable operating bands are accessed by any one of the adjacent cells, then $P_{fcenter}$ will be infinite; and if the central frequencies of the allowable operating bands are not accessed by any one of the adjacent cells, then $P_{fcenter}$ will be 0.

Further to any one of the embodiments above of the method, if the cell is allocated with a frequency resource with the lowest interference and/or load, then the frequency priority coefficients $I_{Band}$ of the allowable operating bands be $I_{Band}$=mean$(\gamma^*I_{Rseg})$, wherein mean$(\gamma^*I_{Rseg})$ represents the weighted averages of the frequency priority coefficients $I_{Rseg}$ of the respective elementary frequency resources in the allowable operating bands, and $\gamma$ represents a weight.

Wherein selecting and allocating one of the available bands for the cell according to the central frequencies and the bandwidths of the stored available bands may include:

sorting the frequency priority coefficients $I_{Band}$ of the available bands according to their magnitude; and selecting the smallest one of the frequency priority coefficients $I_{Band}$ of the available bands, and allocating the available band corresponding to the smallest frequency priority coefficient for the cell; or determining such respective available bands that the differences between the frequency priority coefficients of those available bands and the smallest one of the frequency priority coefficients $I_{Band}$ of the available bands lie in a preset range, selecting the available band with the largest operating band among the determined respective available bands, and allocating the selected available band for the cell.

Further to this, selecting and allocating one of the available bands for the cell according to the central frequencies and the bandwidths of the stored available bands may include:

for each allowable operating bandwidth, determining the smallest one of the frequency priority coefficients $I_{Band}$ of the respective available bands satisfying the allowable operating bandwidth, and selecting the available band corresponding to the smallest frequency priority coefficient;

calculating a coefficient of each selected available band, wherein the coefficient is the product of the allowable operating bandwidth of the available band, and the frequency priority coefficient $I_{Band}$ of the available band, and an offset offset$_{Band}$ corresponding to the allowable operating bandwidth of the available band; and determining the available band corresponding to the largest one of the coefficients, and allocating the determined available band for the cell.

Further to any one of the embodiments above of the method, determining the interference to the cell from each adjacent cells in the elementary frequency resource may include:

determining, by a central node, the position of the adjacent cell according to positional information of a base station, and determining the interference of the adjacent cell to the cell according to the position, and frequency resources of the adjacent cell;

or receiving, by a central node, the interference of the adjacent cell to the cell, reported by a base station, which is determined by the base station measuring the interference of the adjacent cell;

or determining, by a central node, the interference of the adjacent cell, stored in a history record of the cell being enabled in the past, which is measured by a terminal or a base station as the interference of the adjacent cell to the cell.

Further to any one of the embodiments above of the method, determining the respective elementary frequency resources in the respective allowable operating bands of the cell satisfying the optional operating bandwidth may include:

dividing the allowable operating bands satisfying the allowable operating bandwidths, of the cell into a number of elementary frequency resources in elementary units of frequency resources according to a preset correspondence relationship between the allowable operating bandwidths and the elementary units of frequency resources of the cell.

Further to this, the method further includes:

receiving, by a central node, frequency and bandwidth capacity information transmitted by a base station after setting up a connection with a network, and determining respective allowable operating bandwidths and the respective allowable operating bands of the cell enabled by the base station according to the frequency and bandwidth capacity information.

Further to this, before the frequency and bandwidth capacity information transmitted by the base station after setting up the connection with the network is received, the method further may include:

receiving, by the base station, a request message transmitted by a triggering node to request for enabling the cell.

Further to any one of the embodiments above of the method, the method further may include:

instructing, by a central node, a base station to enable the cell, receiving frequency and bandwidth capacity information transmitted by the base station, and determining respective allowable operating bandwidths and the respective allowable operating bands of the cell enabled by the base station according to the frequency and bandwidth capacity information.

Further to any one of the embodiments above of the method, the method further may include:

rejecting, by a central node, the cell for being allocated a frequency resource, and returning a message to a base station enabling the cell that the cell is rejected for an access.

Further to this, the method further may include:

retransmitting, by the base station, a request for allocating a frequency resource for the cell to a central node after a preset length of time elapses.

Further to any one of the embodiments above of the method, the method further may include:

if frequency resources are allocated for a number of cells concurrently, then allocating frequency resources with larger bandwidths for the cells; or allocating frequency resources for the largest number of cells.

A network device includes:

a first determining module configured to determine respective elementary frequency resources in respective allowable operating bands of a cell satisfying an optional operating bandwidth;

a second determining module configured to determine a frequency priority coefficient of each elementary frequency resource, wherein the frequency priority coefficient characterizes interference for the cell, from respective adjacent cells adjacent in position to the cell in the elementary frequency resource, and/or loads of the respective adjacent cells in the elementary frequency resource; and an allocating module configured to allocate a frequency resource for the cell according to the frequency priority coefficients of the elementary frequency resources.

Wherein the second determining module is configured:

to determine the interference to the cell from the respective adjacent cells in the elementary frequency resource, and/or the loads of the adjacent cells in the elementary frequency resource; and to calculate single-cell frequency priority coefficients of the respective adjacent cells for the cell according to the interference to the cell from the adjacent cells in the elementary frequency resource, and/or the loads of the adjacent cells in the elementary frequency resource, and to calculate the frequency priority coefficient of the elementary frequency resource according to the single-cell frequency priority coefficients of the respective adjacent cells for the cell, wherein the single-cell frequency priority coefficient characterizes interference for the cell from a single adjacent cell in the elementary frequency resource, and/or a load of the single adjacent cell in the elementary frequency resource.

Wherein the second determining module is configured:

for each adjacent cell, to calculate the single-cell frequency priority coefficient of the adjacent cell for the cell as the sum of the product of a first weight factor and the load of the adjacent cell in the elementary frequency resource, and the product of a second weight factor and the interference to the cell from the adjacent cell in the elementary frequency resource; and to calculate the frequency priority coefficient $I_{Rseg}$ of the elementary frequency resource as the weighted sum of the single-cell frequency priority coefficients of the respective adjacent cells for the cell.

Wherein the allocating module is configured:

to allocate a frequency resource for the cell according to the frequency priority coefficients of the elementary frequency resources so that the allocated frequency resource is orthogonal to frequency resources of the respective adjacent cells.

Further to this, the second determining module is configured:

to determine the interference to the cell of the adjacent cells in the elementary frequency resource as the single-cell frequency priority coefficients of the adjacent cells for the cell; and to calculate the frequency priority coefficient $I_{Rseg}$ of the elementary frequency resource as the sum of the single-cell frequency priority coefficient of the respective adjacent cells.

Further to this, the allocating module is configured:

to search the respective allowable operating bands satisfying the optional operating bandwidth, of the cell one by one for such an allowable operating band that the frequency priority coefficient $I_{Rseg}$ of each elementary frequency resource thereof is less than or equal to a first available frequency priority coefficient threshold $Th_{Rseg}$, and if such an allowable operating band is located, to terminate the search, and to allocate the located allowable operating band for the cell, wherein the first available frequency priority coefficient threshold $Th_{Rseg}$ represents the smallest value of interference which can be indicated.

Wherein the second determining module is configured:

if the elementary frequency resource is not accessed by any one of the adjacent cells, to determine the frequency priority coefficient of the elementary frequency resource will as 0; and if the elementary frequency resource is accessed by any one of the adjacent cells, to determine the frequency priority coefficient of the elementary frequency resource as 1.

Further to this, the allocating module is configured:

to search the respective allowable operating bands satisfying the optional operating bandwidth, of the cell one by one for such an allowable operating band that the frequency priority coefficient $I_{Rseg}$ of each elementary frequency resource thereof is equal to 0, and if such an allowable operating band is located, to terminate the search, and to allocate the located allowable operating band for the cell.

Wherein the allocating module is configured:

to allocate for the cell a frequency resource with a central frequency which does not overlap with central frequencies of frequency resources of the respective adjacent cells according to the frequency priority coefficients of the elementary frequency resources;

or to allocate for the cell a frequency resource with the lowest interference and/or the lowest load of the allocated frequency resource according to the frequency priority coefficients of the elementary frequency resources.

Wherein the second determining module is further configured:

to calculate frequency priority coefficients $I_{Band}$ of the respective allowable operating bands of the cell satisfying the optional operating band according to the frequency priority coefficients $I_{Rseg}$ of the elementary frequency resources.

Further to this, the allocating module is configured:

to search the respective allowable operating bands satisfying the optional operating bandwidth, of the cell one by one for an absolutely available band, and if an absolutely available band is located, to allocate the absolutely available band for the cell;

wherein the absolutely available band is such that the frequency priority coefficients $I_{Rseg}$ of the respective elementary frequency resources in the allowable operating bands are less than or equal to a preset first absolutely available frequency priority coefficient threshold $Th_{Rseg0}$, and/or the frequency priority coefficients $I_{Band}$ of the allowable operating bands are less than or equal to a preset second absolutely available frequency priority coefficient threshold $Th_0$.

Wherein the allocating module is further configured:

if no absolutely available band is located, to traverse and search the respective allowable operating bands satisfying the optional operating bandwidth, of the cell for respective available bands, to store the available bands, and to select and allocate one of the available bands for the cell according to central frequencies and bandwidths of the stored available bands;

wherein the available bands are such that the frequency priority coefficients $I_{Rseg}$ of the respective elementary frequency resources in the allowable operating bands are less than or equal to a preset first available frequency priority coefficient threshold $Th_{Rseg}$ and/or the frequency priority coefficients $I_{Band}$ of the allowable operating bands are less than or equal to a preset second available frequency priority coefficient threshold $Th_{Band}$.

Wherein the allocating module is further configured:

if no absolutely available band is located, to search the respective allowable operating bands satisfying the optional operating bandwidth, of the cell one by one for an available band, and if an available band is located, to allocate the available band for the cell;

wherein the available band is such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$.

Wherein the allocating module is further configured:

to search the respective allowable operating bands satisfying the optional operating bandwidth, of the cell one by one for an available band, and if an available band is located, to allocate the available band for the cell;

wherein the available band is such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$.

Wherein the allocating module is further configured:

to traverse and search the respective allowable operating bands satisfying the optional operating bandwidth, of the cell for respective available bands, to store the available bands, and to select and allocate one of the available bands for the cell according to central frequencies and bandwidths of the stored available bands;

wherein the available bands are such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$.

Further to any one of the embodiments above of the network device, the allocating module is further configured:

if there are a number of optional operating bandwidths of the cell; to sort the respective optional operating bandwidths of the cell in a descending order, and to select one of the optional operating bandwidths in the descending order.

Wherein the allocating module is configured:

to sort the frequency priority coefficients $I_{Band}$ of the respective allowable operating bands of the cell satisfying the respective optional operating bandwidths according to their magnitude; and to select the smallest one of the frequency priority coefficients $I_{Band}$ of the respective allowable operating bands, and to allocate the allowable operating band corresponding to the smallest frequency priority coefficient for the cell; or to determine such allowable operating bands that the differences between the frequency priority coefficients of those allowable operating bands and the smallest one of the frequency priority coefficients $I_{Band}$ of the respective allowable operating bands lie in a preset range, to select the allowable operating band with the largest operating band among the determined respective allowable operating bands, and to allocate the selected allowable operating band for the cell.

Wherein the allocating module is configured:

for each allowable operating bandwidth, to determine the smallest one of the frequency priority coefficients $I_{Band}$ of the respective allowable operating bands satisfying the allowable operating bandwidth, and to select the allowable operating band corresponding to the smallest frequency priority coefficient;

to calculate a coefficient of each selected allowable operating band, wherein the coefficient is the product of the allowable operating bandwidth of the allowable operating band, and the frequency priority coefficient $I_{Band}$ of the allowable operating band, and an offset $offset_{Band}$ corresponding to the allowable operating bandwidth of the allowable operating band; and to determine the allowable operating band corresponding to the largest one of the coefficients, and to allocate the determined available band for the cell.

Wherein the allocating module is configured:

to sort the frequency priority coefficients $I_{Band}$ of the stored respective available bands according to their magnitude; and to select the smallest one of the frequency priority coefficients $I_{Band}$ of the available bands, and to allocate the available band corresponding to the smallest frequency priority coefficient for the cell; or to determine such respective available bands that the differences between the frequency priority coefficients of those available bands and the smallest one of the frequency priority coefficients $I_{Band}$ of the available bands lie in a preset range, to select the available band with the largest operating band among the determined respective available bands, and to allocate the selected available band for the cell.

Wherein the allocating module is configured:

for each allowable operating bandwidth, to determine the smallest one of the frequency priority coefficients $I_{Band}$ of the respective available bands satisfying the allowable operating bandwidth, and to select the available band corresponding to the smallest frequency priority coefficient;

to calculate a coefficient of each selected available band, wherein the coefficient is the product of the allowable operating bandwidth of the available band, and the frequency priority coefficient $I_{Band}$ of the available band, and an offset $offset_{Band}$ corresponding to the allowable operating bandwidth of the available band; and to determine the available band corresponding to the largest one of the coefficients, and to allocate the determined available band for the cell.

Wherein the second determining module is configured:

to determine the positions of the adjacent cells according to positional information of a base station, and to determine the interference of the adjacent cells to the cell according to the position, and frequency resources of the adjacent cells; or to receive the interference of the adjacent cells to the cell, reported by a base station, which is determined by the base station measuring the interference of the adjacent cells;

or to determine the interference of the adjacent cells, stored in a history record of the cell being enabled in the past, which is measured by a terminal or a base station as the interference of the adjacent cells to the cell.

Wherein the first determining module is configured:

to divide the allowable operating bands satisfying the allowable operating bandwidths, of the cell into a number of elementary frequency resources in elementary units of frequency resources according to a preset correspondence relationship between the allowable operating bandwidths and the elementary units of frequency resources of the cell.

Wherein the first determining module is further configured:

to receive frequency and bandwidth capacity information transmitted by a base station after setting up a connection with a network, and to determine respective allowable operating bandwidths and the respective allowable operating bands of the cell enabled by the base station according to the frequency and bandwidth capacity information.

Wherein the first determining module is further configured:

to instruct a base station to enable the cell, to receive frequency and bandwidth capacity information transmitted by the base station, and to determine respective allowable operating bandwidths and the respective allowable operating bands of the cell enabled by the base station according to the frequency and bandwidth capacity information.

Wherein the allocating module is further configured:

to reject the cell for being allocated a frequency resource, and to return a message to a base station enabling the cell that the cell is rejected for an access.

A network device includes:

a processor configured to read and execute a program in a memory:

to determine respective elementary frequency resources in respective allowable operating bands of a cell satisfying an optional operating bandwidth, to determine a frequency priority coefficient of each elementary frequency resource, wherein the frequency priority coefficient characterizes interference for the cell, from respective adjacent cells adjacent in position to the cell in the elementary frequency resource, and/or loads of the respective adjacent cells in the elementary frequency resource, and to allocate a frequency resource for the cell according to the frequency priority coefficients of the elementary frequency resources;

a transceiver configured to be controlled by the processor to receive and transmit data; and a memory configured to store data used by the processor in operation.

Wherein the processor is configured to read and execute the program in the memory:

to determine the interference to the cell from the respective adjacent cells in the elementary frequency resource, and/or the loads of the adjacent cells in the elementary frequency resource; and to calculate single-cell frequency priority coefficients of the respective adjacent cells for the cell according to the interference to the cell from the adjacent cells in the elementary frequency resource, and/or the loads of the adjacent cells in the elementary frequency resource, and to calculate the frequency priority coefficient of the elementary frequency resource according to the single-cell frequency priority coefficients of the respective adjacent cells for the cell, wherein the single-cell frequency priority coefficient characterizes interference to the cell from a single adjacent cell in the elementary frequency resource, and/or a load of the single adjacent cell in the elementary frequency resource.

Wherein the processor is configured to read and execute the program in the memory:

for each adjacent cell, to calculate the single-cell frequency priority coefficient of the adjacent cell for the cell as the sum of the product of a first weight factor and the load of the adjacent cell in the elementary frequency resource, and the product of a second weight factor and the interference to the cell from the adjacent cell in the elementary frequency resource; and to calculate the frequency priority coefficient $I_{Rseg}$ of the elementary frequency resource as the weighted sum of the single-cell frequency priority coefficients of the respective adjacent cells for the cell.

Wherein the processor is configured to read and execute the program in the memory:

to allocate a frequency resource for the cell according to the frequency priority coefficients of the elementary frequency resources so that the allocated frequency resource is orthogonal to frequency resources of the respective adjacent cells.

Further to this, the processor is configured to read and execute the program in the memory:

to determine the interference to the cell of the adjacent cells in the elementary frequency resource as the single-cell frequency priority coefficients of the adjacent cells for the cell; and to calculate the frequency priority coefficient $I_{Rseg}$ of the elementary frequency resource as the sum of the single-cell frequency priority coefficient of the respective adjacent cells.

Further to this, the processor is configured to read and execute the program in the memory:

to search the respective allowable operating bands satisfying the optional operating bandwidth, of the cell one by one for such an allowable operating band that the frequency priority coefficient $I_{Rseg}$ of each elementary frequency resource thereof is less than or equal to a first available frequency priority coefficient threshold $Th_{Rseg}$, and if such an allowable operating band is located, to terminate the search, and to allocate the located allowable operating band for the cell, wherein the first available frequency priority coefficient threshold $Th_{Rseg}$ represents the smallest value of interference which can be indicated.

Wherein the processor is configured to read and execute the program in the memory:

if the elementary frequency resource is not accessed by any one of the adjacent cells, to determine the frequency priority coefficient of the elementary frequency resource will as 0; and if the elementary frequency resource is accessed by any one of the adjacent cells, to determine the frequency priority coefficient of the elementary frequency resource as 1.

Further to this, the processor is configured to read and execute the program in the memory:

to search the respective allowable operating bands satisfying the optional operating bandwidth, of the cell one by one for such an allowable operating band that the frequency priority coefficient $I_{Rseg}$ of each elementary frequency resource thereof is equal to 0, and if such an allowable operating hand is located, to terminate the search, and to allocate the located allowable operating band for the cell.

Wherein the processor is configured to read and execute the program in the memory:

to allocate for the cell a frequency resource with a central frequency which does not overlap with central frequencies of frequency resources of the respective adjacent cells according to the frequency priority coefficients of the elementary frequency resources;

or to allocate for the cell a frequency resource with the lowest interference and/or the lowest load of the allocated frequency resource according to the frequency priority coefficients of the elementary frequency resources Wherein the processor is further configured to read and execute the program in the memory:

to calculate frequency priority coefficients $I_{Band}$ of the respective allowable operating bands of the cell satisfying the optional operating band according to the frequency priority coefficients $I_{Rseg}$ of the elementary frequency resources.

Further to this, the processor is configured to read and execute the program in the memory:

to search the respective allowable operating bands satisfying the optional operating bandwidth, of the cell one by one for an absolutely available band, and if an absolutely available band is located, to allocate the absolutely available band for the cell;

wherein the absolutely available band is such that the frequency priority coefficients $I_{Rseg}$ of the respective elementary frequency resources in the allowable operating bands are less than or equal to a preset first absolutely available frequency priority coefficient threshold $Th_{Rseg0}$, and/or the frequency priority coefficients $I_{Band}$ of the allowable operating bands are less than or equal to a preset second absolutely available frequency priority coefficient threshold $Th_0$.

Wherein the processor is further configured to read and execute the program in the memory:

if no absolutely available band is located, to traverse and search the respective allowable operating bands satisfying the optional operating bandwidth, of the cell for respective available bands, to store the available bands, and to select and allocate one of the available bands for the cell according to central frequencies and bandwidths of the stored available bands;

wherein the available bands are such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$.

Wherein the processor is further configured to read and execute the program in the memory:

if no absolutely available band is located, to search the respective allowable operating bands satisfying the optional operating bandwidth, of the cell one by one for an available band, and if an available band is located, to allocate the available band for the cell;

wherein the available band is such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$.

Wherein the processor is further configured to read and execute the program in the memory:

to search the respective allowable operating bands satisfying the optional operating bandwidth, of the cell one by one for an available band, and if an available band is located, to allocate the available band for the cell;

wherein the available band is such that the frequency priority coefficients $I_{Rseg}$ of the respective elementary frequency resources in the allowable operating hands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$.

Wherein the processor is further configured to read and execute the program in the memory:

to traverse and search the respective allowable operating bands satisfying the optional operating bandwidth, of the cell for respective available bands, to store the available bands, and to select and allocate one of the available bands for the cell according to central frequencies and bandwidths of the stored available bands;

wherein the available bands are such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$.

Further to any one of the embodiments above of the network device, the processor is further configured to read and execute the program in the memory:

if there are a number of optional operating bandwidths of the cell, to sort the respective optional operating bandwidths of the cell in a descending order, and to select one of the optional operating bandwidths in the descending order.

Wherein the allocating module is configured:

to sort the frequency priority coefficients $I_{Band}$ of the respective allowable operating bands of the cell satisfying the respective optional operating bandwidths according to their magnitude; and to select the smallest one of the frequency priority coefficients $I_{Band}$ of the respective allowable operating bands, and to allocate the allowable operating band corresponding to the smallest frequency priority coefficient for the cell; or to determine such allowable operating bands that the differences between the frequency priority coefficients of those allowable operating bands and the smallest one of the frequency priority coefficients $I_{Band}$ of the respective allowable operating bands lie in a preset range, to select the allowable operating band with the largest operating band among the determined respective allowable operating bands, and to allocate the selected allowable operating band for the cell.

Wherein the processor is configured to read and execute the program in the memory:

for each allowable operating bandwidth, to determine the smallest one of the frequency priority coefficients $I_{Band}$ of the respective allowable operating bands satisfying the allowable operating bandwidth, and to select the allowable operating band corresponding to the smallest frequency priority coefficient;

to calculate a coefficient of each selected allowable operating band, wherein the coefficient is the product of the allowable operating bandwidth of the allowable operating band, and the frequency priority coefficient $I_{Band}$ of the allowable operating band, and an offset $offset_{Band}$ corresponding to the allowable operating bandwidth of the allowable operating band; and to determine the allowable operating band corresponding to the largest one of the coefficients, and to allocate the determined available band for the cell.

Wherein the processor is configured to read and execute the program in the memory:

to sort the frequency priority coefficients $I_{Band}$ of the stored respective available bands according to their magnitude; and to select the smallest one of the frequency priority coefficients $I_{Band}$ of the available bands, and to allocate the available band corresponding to the smallest frequency priority coefficient for the cell; or to determine such respective available bands that the differences between the frequency priority coefficients of those available bands and the smallest one of the frequency priority coefficients $I_{Band}$ of the available bands lie in a preset range, to select the available band with the largest operating band among the determined respective available bands, and to allocate the selected available band for the cell.

Wherein the processor is configured to read and execute the program in the memory:

for each allowable operating bandwidth, to determine the smallest one of the frequency priority coefficients $I_{Band}$ of the respective available bands satisfying the allowable operating bandwidth, and to select the available band corresponding to the smallest frequency priority coefficient;

to calculate a coefficient of each selected available band, wherein the coefficient is the product of the allowable operating bandwidth of the available band, and the frequency priority coefficient $I_{Band}$ of the available band, and an offset $offset_{Band}$ corresponding to the allowable operating bandwidth of the available band; and to determine the available band corresponding to the largest one of the coefficients, and to allocate the determined available band for the cell.

Wherein the processor is configured to read and execute the program in the memory:

to determine the positions of the adjacent cells according to positional information of a base station, and to determine the interference of the adjacent cells to the cell according to the position, and frequency resources of the adjacent cells; or to receive the interference of the adjacent cells to the cell, reported by a base station, which is determined by the base station measuring the interference of the adjacent cells; or to determine the interference of the adjacent cells, stored in a history record of the cell being enabled in the past, which is measured by a terminal or a base station as the interference of the adjacent cells to the cell.

Wherein the processor is configured to read and execute the program in the memory:

to divide the allowable operating bands satisfying the allowable operating bandwidths, of the cell into a number of elementary frequency resources in elementary units of frequency resources according to a preset correspondence relationship between the allowable operating bandwidths and the elementary units of frequency resources of the cell.

Wherein the processor is further configured to read and execute the program in the memory:

to receive frequency and bandwidth capacity information transmitted by a base station after setting up a connection with a network, and to determine respective allowable operating bandwidths and the respective allowable operating bands of the cell enabled by the base station according to the frequency and bandwidth capacity information.

Wherein the processor is further configured to read and execute the program in the memory:

to instruct a base station to enable the cell, to receive frequency and bandwidth capacity information transmitted by the base station, and to determine respective allowable operating bandwidths and the respective allowable operating bands of the cell enabled by the base station according to the frequency and bandwidth capacity information.

Wherein the processor is further configured to read and execute the program in the memory:

to reject the cell for being allocated a frequency resource, and to return a message to a base station enabling the cell that the cell is rejected for an access.

Based upon the technical solutions above, in embodiments of the invention, the respective elementary frequency resources in the respective allowable operating bands satisfying the optional operating bandwidth, of the cell are determined, the frequency priority coefficient of each elementary frequency resource is determined, and a frequency resource is allocated for the cell according to the frequency priority coefficients of the elementary frequency resources, where the frequency resources are divided into the elementary frequency resources so that unified planning for the frequency resources is achieved, and a frequency resource available to the cell served by the base station is determined according to the frequency priority coefficients of the respective elementary frequency resources, to thereby configure reasonably the frequency resources of the base station so as to avoid or alleviate inter-cell interference effectively.

DETAILED DESCRIPTION OF THE EMBODIMENTS

In order to configure reasonably frequency resources of a base station so as to alleviate or avoid inter-cell interference effectively, embodiments of the invention provide a method and apparatus for configuring frequency resources of a base station.

Preferred embodiments of the invention will be described below in details with reference to the drawings.

A core idea of the invention for configuring frequency resources of a base station lies in that a central node divides operating bands of cells into a number of elementary frequency resources in elementary units of frequency resources, maintains reference parameters of the respective elementary frequency resources, and controls frequency resources of a number of base stations or a number of cells to be allocated according to the reference parameters of the respective elementary frequency resources. The reference parameters of the respective elementary frequency resources will be frequency priority coefficients in the following respective embodiments.

In the following respective embodiments, the central node can be a higher-layer network node, e.g., a standalone gateway (GW), or a core network node, or an Operation, Administration and Maintenance (OAM) entity; or the central node can alternatively be a base station which can manage allocation of frequency resources of a number of base stations, or a number of cells served by the base stations, and the central node can be regarded as a super base station.

Figure 1A:
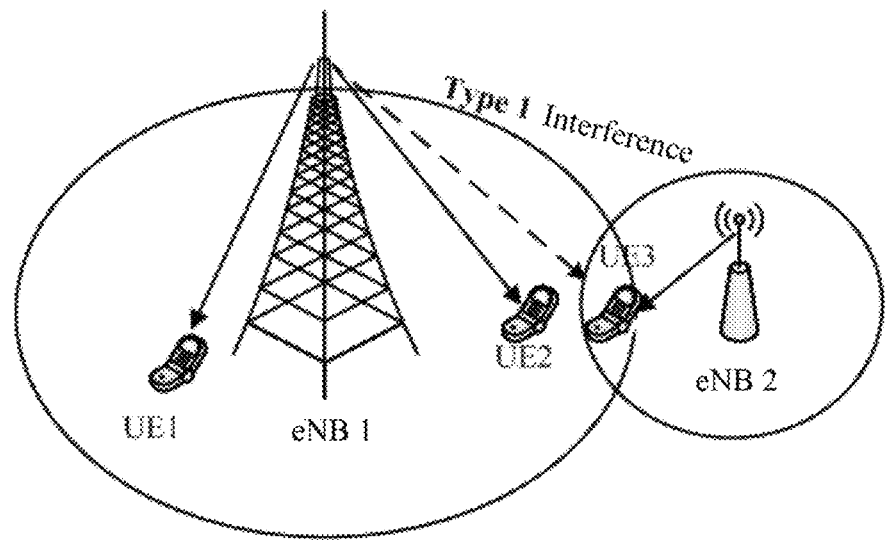
FIG. 1a is a schematic diagram of inter-cell interference in the prior art.
Figure 1B:
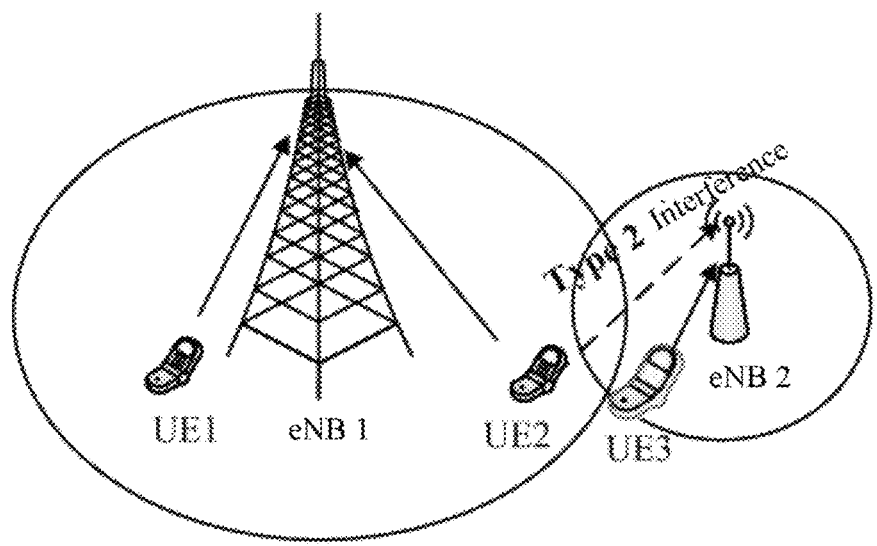
FIG. 1b is another schematic diagram of inter-cell interference in the prior art.
Figure 2:
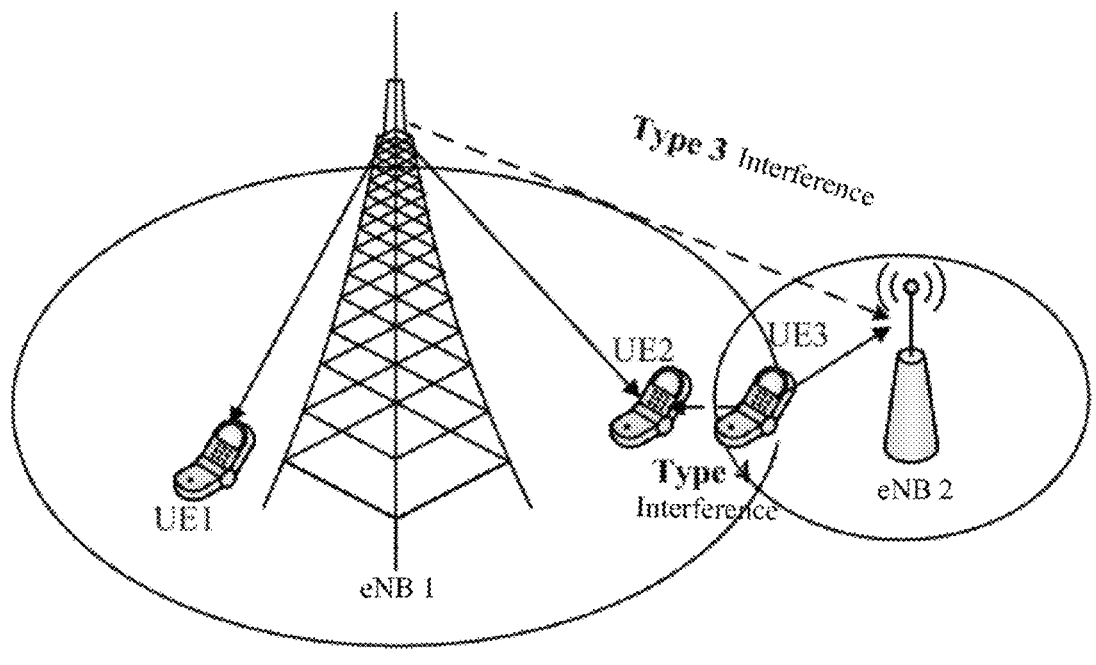
FIG. 2 is still another schematic diagram of inter-cell interference in the prior art.
Figure 3:
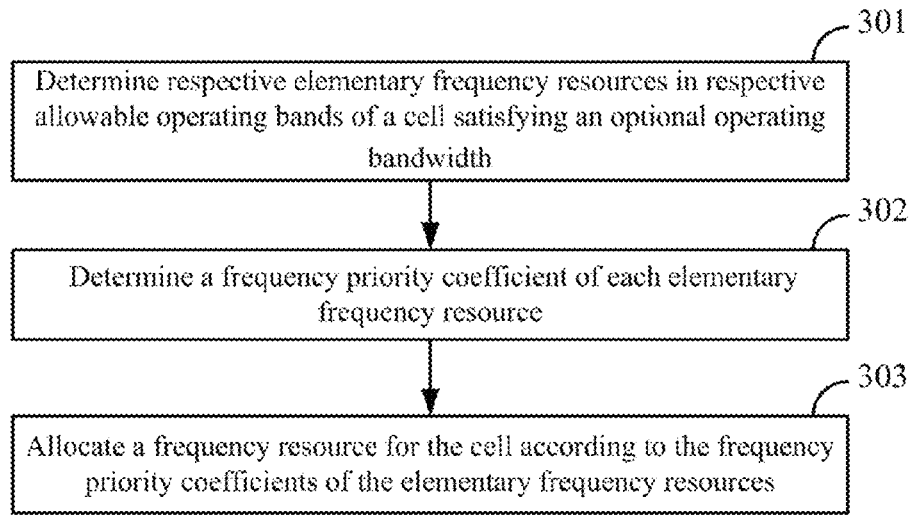
FIG. 3 is a flow chart of a method for configuring frequency resources of a base station according to an embodiment of the invention.

In an embodiment of the invention, as illustrated in FIG. 3, a detailed flow of a method for configuring frequency resources of a base station will be as follows:

The step 301 is to determine respective elementary frequency resources in respective allowable operating bands of a cell satisfying an optional operating bandwidth.

In a particular implementation, the base station receives a request message transmitted by a triggering node to request for enabling a cell, and sets up a connection with a network, and then transmits frequency and bandwidth capacity information to a central node.

The central node receives the frequency and bandwidth capacity information transmitted by the base station after setting up the connection, and determines respective allowable operating bandwidths and the respective allowable operating bands of the cell enabled by the base station according to the frequency and bandwidth capacity information.

In another particular implementation, the central node instructs the base station to enable the cell, receives the frequency and bandwidth capacity information transmitted by the base station, and determines respective allowable operating bandwidths and the respective allowable operating bands of the cell enabled by the base station according to the frequency and bandwidth capacity information.

Here the allowable operating bandwidth refers to a frequency range lying in a particular band, where if the optional operating bandwidth of the cell is 20 MHz, then the allowable operating bandwidth will be 20 MHz in the band of 3.4 GHz to 3.6 GHz. The allowable operating band refers to an intersection of operating bands supported by the base station serving the cell (i.e., operating bands preset upon shipping from a factory), and operating bands allocated by an operator for the base station.

In an embodiment of the invention, the allowable operating bands, satisfying the allowable operating bandwidths, of the cell for which a frequency resource is to be allocated are divided into a number of elementary frequency resources in elementary units of frequency resources corresponding to the allowable operating bandwidths according to a preset correspondence relationship between the allowable operating bandwidths and the elementary units of frequency resources of the cell, where the elementary frequency resource refers to a frequency resource with the size of one elementary unit of frequency resource.

Here the elementary unit of frequency resource refers to an elementary frequency resource of which an operating band of a cell can be composed, and in Long Term Evolutions (LTE) system including an LTE system, an LTE-Advanced (LTE-A) system, an LIE system with hotspot and indoor coverage (LTE-Hi) system, etc., the bandwidth of a cell includes 1.4 MHz, 3 MHz; 5 MHz, 10 MHz, and 20 MHz, and possibly larger bandwidths in the future.

For example, if the operating bandwidth of a cell is 1.4 MHz, then the elementary unit of frequency resource (Rseg) will be 1.4 MHz, where the bandwidth in which a system message and a Primary Synchronization Signal (PSS)/Secondary Synchronization Signal (SSS) are transmitted is 1.4 MHz, and a base station is allocated a bandwidth of one elementary unit of frequency resource.

In another example, if the operating bandwidth of a cell is 3 MHz, then the Rseg will be 1.25 MHz or 1.5 MHz, where the Rseg is 1.25 MHz for a larger band to be composed, and 1.5 MHz for central frequencies of different cells to be spaced from each other to thereby avoid a system message and a PSS from interference with each other. If the Rseg is 1.25 MHz, then the central frequency of a bandwidth allocated for a base station will be an intersection of two Rseg segments; and if the Rseg is 1.5 MHz, then the base station will be allocated a bandwidth which is an integer multiple of the Rseg.

In still another example, if the operating bandwidth of the cell is more than 5 MHz, then the Rseg will be 1.25 MHz or 1.5 MHz or 5 MHz. The Rseg is 1.25 MHz or 2.5 MHz for central frequencies of different cells to be spaced from each other to thereby avoid a system message and a PSS from interference with each other. The base station is allocated a bandwidth which is an integer multiple of the Rseg, and particularly the bandwidth of the base station is equal to one Rseg or 2N*Rseg, where N is a positive integer more than or equal to 1; and the bandwidth of the base station being one Rseg will be only applicable to the scenario where the Rseg is 5 MHz, and the bandwidth of the base station is also 5 MHz.

Figure 4:
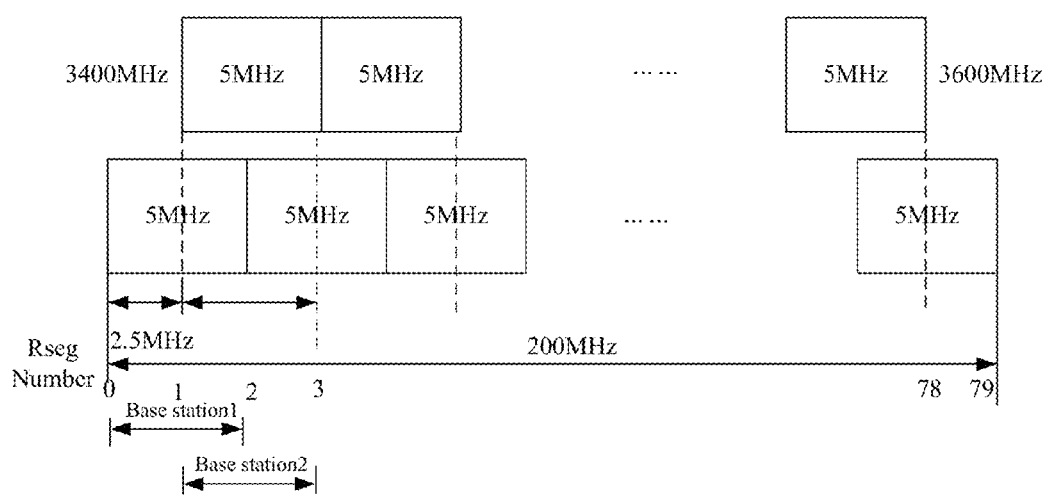
FIG. 4 is a schematic diagram of a relationship between an operating bandwidth of a base station, and an Rseg number according to an embodiment of the invention.

As illustrated in FIG. 4, if the operating bandwidth of the base station is 5 MHz; for example, then the Rseg will be 2.5 MHz, the central frequency will start with 3402.5 MHz, and the base station will be allocated a bandwidth which is an integer multiple of 5 MHz. A base station 1 is allocated frequency resources of Rseg1 and Rseg2, that is, the operating band of the base station 1 is 3400 to 3405 MHz; and a base station 2 is allocated frequency resources of Rseg2 and Rseg3, that is, the operating band of the base station 2 is 3402.5 to 3407.5 MHz.

The step 302 is to determine a frequency priority coefficient of each elementary frequency resource, where the frequency priority coefficient characterizes interference for the cell, from respective adjacent cells adjacent in position to the cell in the elementary frequency resource, and/or loads of the respective adjacent cells in the elementary frequency resource.

The central node and the base station maintain a table of frequency priorities of the respective elementary frequency resources respectively in which there are corresponding frequency priority coefficients corresponding to the respective elementary frequency resources, where the value of the frequency priority coefficient of the elementary frequency resource indicates whether the segment of frequency resource can be allocated for the base station to access for higher transmission performance of the base station.

In an embodiment of the invention, in the table of frequency priorities, if the value of a frequency priority coefficient of an elementary frequency resource is larger, than the priority at which the segment of frequency resource is accessible will be lower, and if the value of the frequency priority coefficient is 0, then the priority at which the segment of frequency resource is accessible will be the highest.

Here the table of frequency priorities can be maintained per cluster of cells, that is, a separate table of frequency priorities is maintained for each cluster of cells including a number of adjacent cells; or the table of frequency priorities can be maintained per cell; that is, a table of frequency priorities is maintained for each cell, where the table of frequency priorities includes interference from adjacent cells thereof.

The table of frequency priorities maintained per cluster of cells is as depicted in Table 1, and is maintained in both the central node and the base station. There are only the frequency priority coefficients of the elementary frequency resources corresponding to the respective Rseg in the allowable operating bands of the cell in the table of frequency priorities, where NaN indicates that the range of the allowable operating band of the cell has been exceeded, cell1 to celln represent identifiers of a cell 1 to a cell n, and $I_{Rseg}$ represents a frequency priority coefficient of an elementary frequency resource corresponding to an Rseg with the number of i ranging from 0 to N.

TABLE 1

| | Rseg number | | | |
|---|---|---|---|---|
| | 0 | 1 | ... | N |
| cell1 | $I_{Rseg0}$ | $I_{Rseg1}$ | ... | NaN |
| cell2 | $I_{Rseg0}$ | $I_{Rseg1}$ | ... | NaN |
| celln | $I_{Rseg0}$ | $I_{Rseg1}$ | ... | $I_{RsegN}$ |

The table of frequency priorities maintained per cell is as depicted in Table 2, and maintained in both the central node and the base station. There are only the frequency priority coefficients of the Rseg in the allowable operating bands of the cell in the table of frequency priorities, where $I_{RsegBi}$ represents a frequency priority coefficient of an elementary frequency resource corresponding to an Rseg with the number of Bi in an allowable operating band of the cell.

TABLE 2

| | Rseg number | | | |
|---|---|---|---|---|
| | B0 | B1 | ... | Bk |
| cell1 | $I_{RsegB0}$ | $I_{RsegB1}$ | ... | $I_{RsegBk}$ |

In an embodiment of the invention, the interference to the cell from the respective adjacent cells in the elementary frequency resource, and/or the loads of the adjacent cells in the elementary frequency resource are determined; single-cell frequency priority coefficients of the respective adjacent cells for the cell are calculated according to the interference to the cell from the adjacent cells in the elementary frequency resource, and/or the loads of the adjacent cells in the elementary frequency resource, and the frequency priority coefficient of the elementary frequency resource is calculated according to the single-cell frequency priority coefficients of the respective adjacent cells for the cell, where the single-cell frequency priority coefficient characterizes interference to the cell from a single adjacent cell in the elementary frequency resource, and/or a load of the single adjacent cell in the elementary frequency resource.

The frequency priority coefficient of the elementary frequency resource can be calculated particularly in the following particular implementations:

In a first particular implementation, for each adjacent cell, the single-cell frequency priority coefficient of the adjacent cell for the cell is calculated as the sum of the product of a first weight factor $a_1$ and the load of the adjacent cell in the elementary frequency resource, and the product of a second weight factor $a_2$ and the interference to the cell from the adjacent cell in the elementary frequency resource; and The frequency priority coefficient $I_{Rseg}$ of the elementary frequency resource is calculated as the weighted sum of the single-cell frequency priority coefficients of the respective adjacent cells for the cell.

In a particular implementation, the frequency priority coefficient $I_{Rseg}$ of the elementary frequency resource is calculated as the sum of the products of the single-cell frequency priority coefficients of the respective adjacent cells and weight coefficients corresponding to the respective adjacent cells.

Here the single-cell frequency priority coefficient of the adjacent cell celln for the cell cell1 for which a frequency resource is to be allocated, in the elementary frequency resource is represented as:

$$i_{celln\text{-}cell1} = a_1 * \text{cell}n \text{ cell load} + a_2 * \text{cell interference of celln to cell1} \quad \text{(Equation 1)}.$$

In a real application, for the respective elementary frequency resources occupied by the cell celln, $i_{celln\text{-}cell1}$ of the elementary frequency resources in the respective bands can be calculated respectively, or take the same value, dependent upon the cell loads of the celln in the elementary frequency resources, and/or the interference to the cell from the celln in the elementary frequency resources, which are narrowband measured values calculated for the different frequency resources, or broadband measured values throughout the bandwidth of the cell.

The frequency priority coefficient of the cell cell1 in the elementary frequency resource can be represented as:

$$I_{Rseg} = \Sigma \beta_n * i_{celln\text{-}cell1} \quad \text{(Equation 2)},$$

Where $\beta_n$ represents the weight coefficient corresponding to the cell celln.

In a real application, if the interference of the different adjacent cells is not distinguished from each other, then the weight coefficients corresponding to the adjacent cells will be fixed at 1.

In this particular implementation, if the single-cell frequency priority coefficient is normalized, then it will be further stated that:

The sum of the first weight factor and the second weight factor is 1;

The interference to the cell from the adjacent cells in the elementary frequency resource is the ratios of interference measured values of the adjacent cells to the cell to the quantified largest interference value, where the interference measured values of the adjacent cells to the cell are measured strength values of Reference Signal Received Power (RSRP) or other reference signals of the adjacent cells measured in the cell1; and The loads of the adjacent cells range from 0 to 1, where "0" indicates that none of resources of the adjacent cells is occupied, and "1" indicates that all the resources of the adjacent cells are occupied.

In a second particular implementation, the interference to the cell from the adjacent cells in the elementary frequency resource is determined as the single-cell frequency priority coefficients of the adjacent cells to the cell; and The frequency priority coefficient $I_{Rseg}$ of the elementary frequency resource is calculated as the sum of the single-cell frequency priority coefficients of the respective adjacent cells.

In an embodiment of the invention, the frequency prior coefficient of each elementary frequency resource is further determined in a simplified manner particularly as follows:

If the elementary frequency resource is not accessed by any one of the adjacent cells, then the frequency priority coefficient of the elementary frequency resource will be determined as 0; and If the elementary frequency resource is accessed by any one of the adjacent cells, then the frequency priority coefficient of the elementary frequency resource will be determined as 1.

In an embodiment of the invention, the inference to the cell for which a frequency resource is to be allocated, from each adjacent cell in the elementary frequency resource can be determined particularly in the following several schemes:

The central node determines the position of the adjacent cell according to positional information of the base station, and determines the interference of the adjacent cell to the cell according to the position, and frequency resources of the adjacent cell;

Or

The central node receives the interference of the adjacent cell to the cell, reported by the base station, which is determined by the base station measuring the interference of the adjacent cell;

Or

The central node determines the interference of the adjacent cell, stored in a history record of the cell being enabled in the past, which is measured by a terminal or the base station as the interference of the adjacent cell to the cell.

Furthermore in an embodiment of the invention, after the frequency priority coefficient of each elementary frequency resource is determined, frequency priority coefficients $I_{Band}$ of the respective allowable operating bands satisfying the optional operating bandwidth, of the cell are calculated according to the frequency priority coefficients $I_{Rseg}$ of the respective elementary frequency resources, where the frequency priority coefficient of an allowable operating band characterizes interference to the cell from the respective adjacent cells adjacent in position to the cell in the allowable operating band, and/or loads of the respective adjacent cells in the allowable operating band.

In an embodiment of the invention, the frequency priority coefficients $I_{Band}$ of the respective allowable operating bands can be calculated particularly in the following two schemes dependent upon whether a frequency resource is allocated for the cell taking overlapping central frequencies into account:

In a first calculation scheme, a central frequency of an operating band allocated for the cell shall not overlap with central frequencies of operating bands of the other cells particularly as follows:

The frequency priority coefficient $I_{Band}$ of an allowable operating band is $I_{Band}=\text{mean}(\gamma^*I_{Rseg})+P_{fcenter}$, where mean $(\gamma^*I_{Rseg})$ represents the weighted average of the frequency priority coefficients $I_{Rseg}$ of the respective elementary frequency resources in the allowable operating band, $\gamma$ represents a weight, and $P_{fcenter}$ represents a factor reflecting an overlapping condition of a central frequency of the allowable operating band.

Preferably if the central frequency of the allowable operating band is accessed by any one of the adjacent cells, then $P_{fcenter}$ will be infinite; and If the central frequency of the allowable operating band is not accessed by any one of the adjacent cells, then $P_{fcenter}$ will be 0.

In a second calculation scheme, a central frequency of an operating band allocated for the cell overlapping with central frequencies of operating bands the other cells will not be taken into account particularly as follows:

The frequency priority coefficient $I_{Band}$ of an allowable operating band is $I_{Band}=\text{mean}(\gamma^*I_{Rseg})$, where mean$(\gamma^*I_{Rseg})$ represents the weighted average of the frequency priority coefficients of $I_{Rseg}$ the respective elementary frequency resources in the allowable operating band, and $\gamma$ represents a weight.

The step 303 is to allocate a frequency resource for the cell according to the frequency priority coefficients of the elementary frequency resources.

Preferably a frequency resource is allocated for the cell according to the frequency priority coefficients of the elementary frequency resources so that the allocated frequency resource is orthogonal to frequency resources of the respective adjacent cells;

Or

A frequency resource is allocated for the cell according to the frequency priority coefficients of the elementary frequency resources so that a central frequency of the allocated frequency resource does not overlap with central frequencies of frequency resources of the respective adjacent cells;

Or

A frequency resource is allocated for the cell according to the frequency priority coefficients of the elementary frequency resources so that there is the lowest interference and/or the lowest load of the allocated frequency resource.

In an embodiment of the invention, if frequency resources are allocated for a number of cells, then frequency resources with larger bandwidths will be allocated for the cells, or frequency resources will be allocated for the largest number of cells.

In an embodiment of the invention, a frequency resource can be allocated for the cell according to the frequency priority coefficients of the respective elementary frequency resources in the following several particular implementations:

In a first particular implementation, firstly the respective allowable operating bands satisfying the optional operating bandwidth are searched for an absolutely available band, and if the absolutely available band is located, then the absolutely available band will be allocated directly for the cell; otherwise, an available band will be further searched for.

Particularly:

The respective allowable operating bands satisfying the optional operating bandwidth, of the cell are searched one by one for an absolutely available band, and if an absolutely available band is located, then the absolutely available band will be allocated for the cell;

Here the absolutely available band is such that the frequency priority coefficients $I_{Rseg}$ of the respective elementary frequency resources in the allowable operating bands are less than or equal to a preset first absolutely available frequency priority coefficient threshold $Th_{Rseg0}$, and/or the frequency priority coefficients $I_{Band}$ of the allowable operating bands are less than or equal to a preset second absolutely available frequency priority coefficient threshold $Th_0$.

If no absolutely available band is located, then an available band will be searched for in the following two schemes:

In a first scheme, the respective allowable operating bands satisfying the optional operating bandwidth, of the cell are traversed and searched for respective available bands, the available bands are stored, and one of the available bands is selected and allocated for the cell according to central frequencies and bandwidths of the stored available bands;

Here the available bands are such that the frequency priority coefficients $I_{Rseg}$ of the respective elementary frequency resources in the allowable operating bands are less than or equal to a preset first available frequency priority coefficient threshold $Th_{Rseg}$ and/or the frequency priority coefficients $I_{Band}$ of the allowable operating bands are less than or equal to a preset second available frequency priority coefficient threshold $Th_{Band}$.

In a second scheme, the respective allowable operating bands satisfying the optional operating bandwidth, of the cell are traversed and searched for respective available bands, and the available bands are allocated for the cells;

Where the available bands are such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$.

In a second particular implementation, the respective allowable operating bands satisfying, the optional operating bandwidth are searched for available bands, and a frequency resource is allocated for the cell based upon the located available bands, particularly in the following two implementations:

In a first implementation, the respective allowable operating bands satisfying the optional operating bandwidth, of the cell are searched one by one for an available band, and if an available band is located, then the available band will be allocated for the cell;

Here the available band is such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$.

In a second implementation, the respective allowable operating bands satisfying the optional operating bandwidth, of the cell are searched one by one for respective available bands, the available bands are stored, and one of the available bands is selected and allocated for the cell according to central frequencies and bandwidths of the stored available bands;

Here the available bands are such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$.

Preferably in the first and second particular implementation above, one of the available bands can be selected and allocated for the cell according to the central frequencies and the bandwidths of the stored available bands particularly as follows:

The frequency priority coefficients $I_{Band}$ of the available bands are sorted according to their magnitude; and The smallest one of the frequency priority coefficients $I_{Band}$ of the available bands is selected, and the available band corresponding to the smallest frequency priority coefficient is allocated for the cell; or Such respective available bands are determined that the differences between the frequency priority coefficients of those available bands and the smallest one of the frequency priority coefficients $I_{Band}$ of the available bands lie in a preset range, the available band with the largest operating band among the determined respective available bands is selected, and the selected available band is allocated for the cell.

In a preferred implementation, one of the available bands can be selected according to the frequency priority coefficients $I_{Band}$ of the available bands particularly as follows:

For each allowable operating bandwidth, the smallest one of the frequency priority coefficients $I_{Band}$ of the respective available bands satisfying the allowable operating bandwidth is determined, and the available band corresponding to the smallest frequency priority coefficient is selected;

A coefficient of each selected available band is calculated; where the coefficient is the product of the allowable operating bandwidth of the available band, and the frequency priority coefficient $I_{Band}$ of the available band, and an offset offset$_{Band}$ corresponding to the allowable operating bandwidth of the available band;

The available band corresponding to the largest one of the coefficients is determined, and the determined available band is allocated for the cell.

In a third particular implementation, a frequency resource is allocated for the cell according to the frequency priority coefficients $I_{Band}$ of the respective allowable operating bands particularly as follows:

The frequency priority coefficients $I_{Band}$ of the respective allowable operating bands of the cell satisfying the respective optional operating bandwidths are sorted according to their magnitude;

The smallest one of the frequency priority coefficients $I_{Band}$ of the respective allowable operating bands is selected, and the allowable operating band corresponding to the smallest frequency priority coefficient is allocated for the cell; or Such allowable operating bands are determined that the differences between the frequency priority coefficients of those allowable operating bands and the smallest one of the frequency priority coefficients $I_{Band}$ of the respective allowable operating bands lie in a preset range, the allowable operating band with the largest operating band among the determined respective allowable operating bands is selected, and the selected allowable operating band is allocated for the cell.

In a preferred embodiment, for each allowable operating bandwidth, the smallest one of the frequency priority coefficients $I_{Band}$ of the respective allowable operating bands satisfying the allowable operating bandwidth is determined, and the allowable operating band corresponding to the smallest frequency priority coefficient is selected;

A coefficient of each selected allowable operating band is calculated, where the coefficient is the product of the allowable operating bandwidth of the allowable operating band, and the frequency priority coefficient $I_{Band}$ of the allowable operating band, and an offset offset$_{Band}$ corresponding to the allowable operating bandwidth of the allowable operating band; and The allowable operating band corresponding to the largest one of the coefficients is determined, and the determined available band is allocated for the cell.

In the first to third particular implementations above, if such a frequency resource is allocated for the cell that the central frequency thereof does not overlap with the central frequencies of the frequency resources of the respective adjacent cells, then the frequency priority coefficients $I_{Band}$ of the respective allowable operating bands will be calculated in the first calculation scheme in the step 302; and if a frequency resource with the lowest interference and/or the lowest load is allocated for the cell, then the frequency priority coefficients $I_{Band}$ of the respective allowable operating bands will be calculated in the second calculation scheme in the step 302.

In a fourth particular implementation correspondence to the second particular implementation in which the frequency priority coefficients of the elementary frequency resources are calculated in the step 302, a frequency resource is allocated for the cell according to the frequency priority coefficients of the elementary frequency resources particularly as follows:

The respective allowable operating bands satisfying the optional operating bandwidth, of the cell are searched one by one for such an allowable operating band that the frequency priority coefficient $I_{Rseg}$ of each elementary frequency resource thereof is less than or equal to a first available frequency priority coefficient threshold $Th_{Rseg}$, and if such an allowable operating band is located, then the search will be terminated, and the located allowable operating band will be allocated for the cell, where the first available frequency priority coefficient threshold $Th_{Rseg}$ represents the smallest value of interference which can be indicated.

In a fifth particular implementation, in correspondence to the simplified manner in which the frequency priority coefficients of the elementary frequency resources are calculated in the step 302, a frequency resource is allocated for the cell according to the frequency priority coefficients of the elementary frequency resources particularly as follows:

The respective allowable operating bands satisfying the optional operating bandwidth, of the cell are searched one by one for such an allowable operating band that the frequency priority coefficient $I_{Rseg}$ of each elementary frequency resource thereof is equal to 0, and if such an allowable operating band is located, then the search will be terminated, and the located allowable operating band will be allocated for the cell.

In the fourth and fifth particular implementations above, the frequency resource allocated for the cell is orthogonal to the frequency resources of the respective adjacent cells, that is, the frequency resource allocated for the cell does not overlap with the frequency resources of the adjacent cells.

Figure 5:
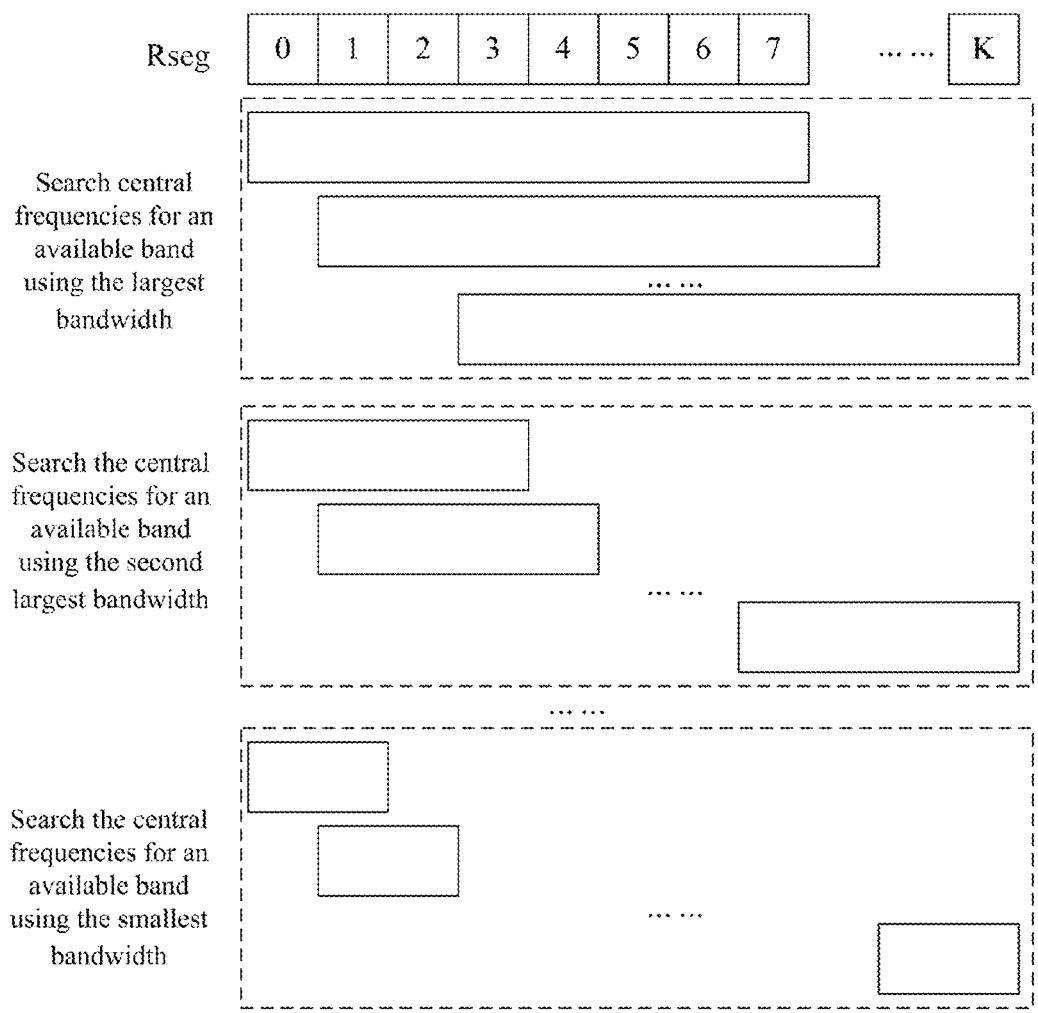
FIG. 5 is a schematic diagram of a process of searching for available bands according to respective optional operating bandwidths according to an embodiment of the invention.

Preferably in the first to fifth particular implementations above, before the respective allowable operating bands satisfying the optional operating bandwidth, of the cell are searched one by one, or before the respective allowable operating bands satisfying the optional operating bandwidth, of the cell are traversed, if there are a number of optional operating bandwidths of the cell, then the respective optional operating bandwidths of the cell will be sorted in a descending order, and then one of the optional operating bandwidths will be selected in the descending order. After one of the optional operating bandwidths is selected and searched or traversed for respective allowable operating bands satisfying the optional operating bandwidth, if an absolutely available band/or an available band needs to be searched for, then the next optional operating bandwidth will be further selected in the descending order and searched or traversed for respective allowable operating bands of the optional operating bandwidth. FIG. 5 illustrates a process of searching for available bands one by one in a descending order of respective optional operating bandwidths.

Preferably if the central node does not locate any frequency resource which can be allocated to the cell for which a frequency resource is currently to be allocated, then the central node will reject allocation of a frequency resource for the cell, and return a message that the cell is rejected for an access to the bases station enabling the cell.

Preferably the base station sets a timer upon reception of the message transmitted by the central node that the cell is rejected for an access, and retransmits a request for allocating a frequency resource for the cell to the central node after a preset length of time elapses.

The method for configuring frequency resources of a base station according to the embodiment of the invention will be described below in details in connection with seven particular embodiments thereof.

Figure 6:
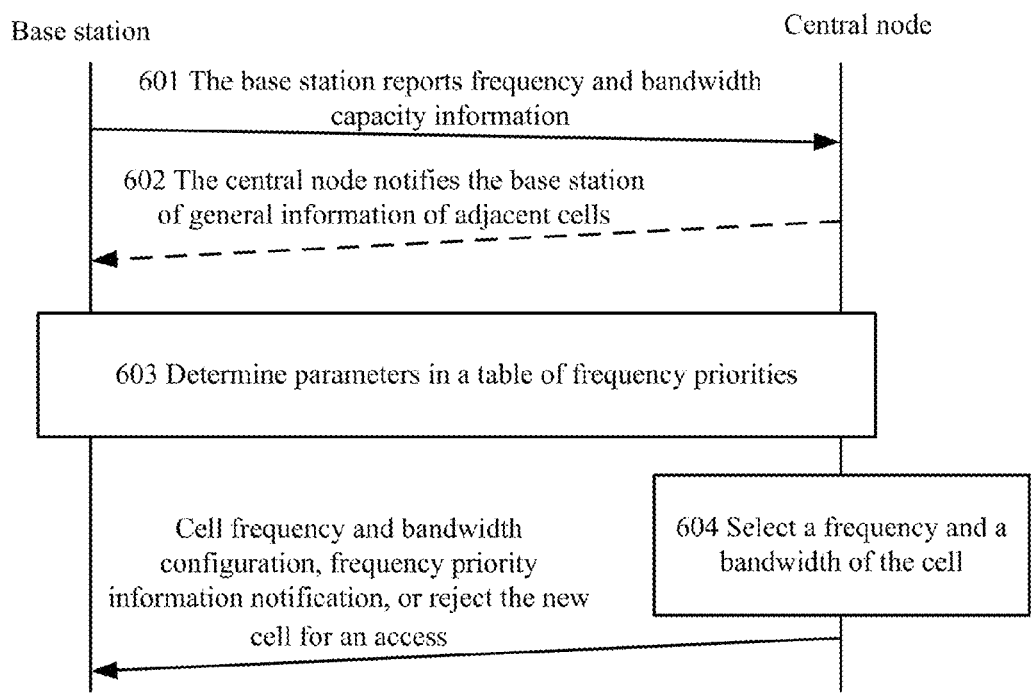
FIG. 6 is a schematic diagram of a process of requesting by a base station for allocating frequency resources according to an embodiment of the invention.

In a first particular embodiment, as illustrated in FIG. 6, a base station requests for allocating a frequency resource for a newly enabled cell particularly as follows:

In this particular embodiment, if the base station is powered on, or the base station is to enable a next cell served by the base station, then the base station will transmit a request to a central node so that the central node allocates a frequency resource for the newly enabled cell.

Step 601: The base station sets up a connection with a network, and reports frequency and bandwidth capacity information to the central node.

Step 602: Optionally if the central node can determine general information of adjacent cells of the newly enabled cell, then the central node will notify the base station of the general information of the adjacent cells, where the general information of the adjacent cells generally include frequency information of the adjacent cells.

Step 603: The central node determines and maintains parameters in a table of frequency priorities (frequency priority parameters), and maintains the table of frequency priorities for a cluster of cells where the base station resides, or for the cells enabled by the base station, where the parameters in the table of frequency priorities are determined in the following several schemes:

In a first scheme, the central node determines the adjacent cells of the newly enabled cell for which a frequency resource needs to be allocated, according to positional information or other information of the base station, determines interference of the adjacent cells to the newly enabled cell according to positional relationships between and frequency resources of the adjacent cells, and determines frequency priority parameters of the cell newly enabled over respective elementary frequency resources in Equation 1 or Equation 2 above;

In a second scheme, the base station measures interference of the adjacent cells, e.g., RSRP, path losses, etc., of the adjacent cells, determines interference conditions of the adjacent cells to the newly enabled cell; and reports the interference conditions to the central node; and the central node determines frequency priority parameters of the cell newly enabled over respective elementary frequency resources based upon loads of the adjacent cells over the respective elementary frequency resources in Equation 1 or Equation 2 above; and In a third scheme; the central node retrieves interference of the adjacent cells, measured by a terminal served by the newly enabled cell, stored in a history record of the cell being enabled in the past, or interference of the adjacent cells, measured by the base station, stored in the history record as interference of the adjacent cells to the newly enabled cell, and determines frequency priority parameters of the cell newly enabled over respective elementary frequency resources based upon loads of the adjacent cells over the respective elementary frequency resources in Equation 1 or Equation 2 above.

Step 604: The central node searches for and allocates an available band for the newly enabled cell according to the respective priority coefficients in the table of frequency priorities, configures the newly enabled cell with a frequency and a bandwidth, and notifies the base station of the table of frequency priorities, information about the adjacent cells, and other reference information of the newly enabled cell.

If no available band is located, then the central node will reply to the base station with a message that the newly enabled cell is rejected for an access.

If the central node rejects the newly enabled cell for being configured with a frequency resource, then the base station will set a timer, and reinitiate an access request after a preset interval of time.

Figure 7:
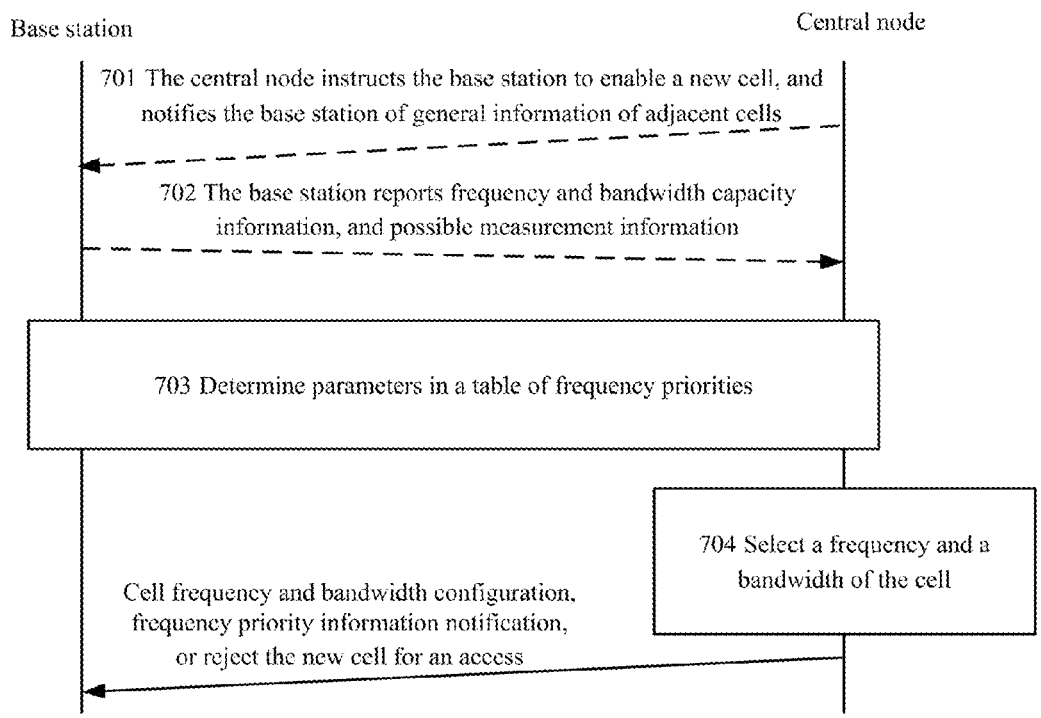
FIG. 7 is a schematic diagram of a process of triggering by a central node allocation for frequency resources according to an embodiment of the invention.

In a second particular embodiment, as illustrated in FIG. 7, in order to satisfy a demand for an amount of service data in an area, or due to another reason, a central node triggers a base station to enable anew cell, and configures the newly enabled cell with a frequency resource, particularly as follows:

Step 701: The central node instructs the base station to enable a new cell, and optionally the central node notifies the base station of information about adjacent cells of the newly enabled cell, where the information generally includes frequency information of the adjacent cells;

Step 702: The base station reports frequency and bandwidth capacity information, and optionally measurement information to the central node; and Step 703: The central node determines and maintains parameters (frequency priority coefficients) in a table of frequency priorities, where the central node and maintains the table of frequency priorities for a cluster of cells where the base station resides, or for the cells enabled by the base station, and determines the respective frequency priority coefficients in the table of frequency priorities, in the following schemes:

In a first scheme, the central node determines the adjacent cells of the newly enabled cell for which a frequency resource needs to be allocated, according to positional information or other information of the base station, determines interference of the adjacent cells to the newly enabled cell according to positional relationships between the adjacent cells and the newly enabled cell, and frequency resources of the adjacent cells, and determines frequency priority parameters of the cell newly enabled over respective elementary frequency resources based upon loads of the adjacent cells over the respective elementary frequency resources in Equation 1 or Equation 2 above. In this step, if the central node has known frequency and bandwidth capacity information of the newly enabled cell, then the step 701 and the step 702 may be omitted;

In a second scheme, the base station measures interference of the adjacent cells, e.g., RSRP, path losses, etc., of the adjacent cells, determines interference conditions of the adjacent cells to the newly enabled cell, and reports the interference conditions to the central node; and the central node determines frequency priority parameters of the cell newly enabled over respective elementary frequency resources based upon loads of the adjacent cells over the respective elementary frequency resources in Equation 1 or Equation 2 above; and In a third scheme, the central node retrieves interference of the adjacent cells, measured by a terminal served by the newly enabled cell, stored in a history record of the cell being enabled in the past, or interference of the adjacent cells, measured by the base station, stored in the history record as interference of the adjacent cells to the newly enabled cell, and determines frequency priority parameters of the cell newly enabled over respective elementary frequency resources based upon loads of the adjacent cells over the respective elementary frequency resources in Equation 1 or Equation 2 above. In this step, if the central node has known frequency and bandwidth capacity information of the newly enabled cell, then the step 701 and the step 702 may be omitted; and Step 704: The central node searches for and allocates an available band for the newly enabled cell according to the respective priority coefficients in the table of frequency priorities, configures the newly enabled cell with a frequency and a bandwidth, and notifies the base station of the table of frequency priorities, information about the adjacent cells, and other reference information of the newly enabled cell.

If no available band is located, then the central node will reply to the base station with a message that the newly enabled cell is rejected for an access.

If the central node rejects the newly enabled cell for being configured with a frequency resource, then the base station will set a timer, and reinitiate an access request after a preset interval of time.

In a third particular embodiment, enabling of a new cell can be triggered by another network node, e.g., a macro cell. The other network node can instruct the base station to enable the new cell, and the base station enabling the new cell can instruct the central node to configure the newly enabled cell with a frequency resource; or the other network node can instruct the central node to enable the new cell, and to configure the newly enabled cell with a frequency resource.

In this particular embodiment, the other network node triggering the new cell to be enabled will be referred to a triggering node.

Figure 8:
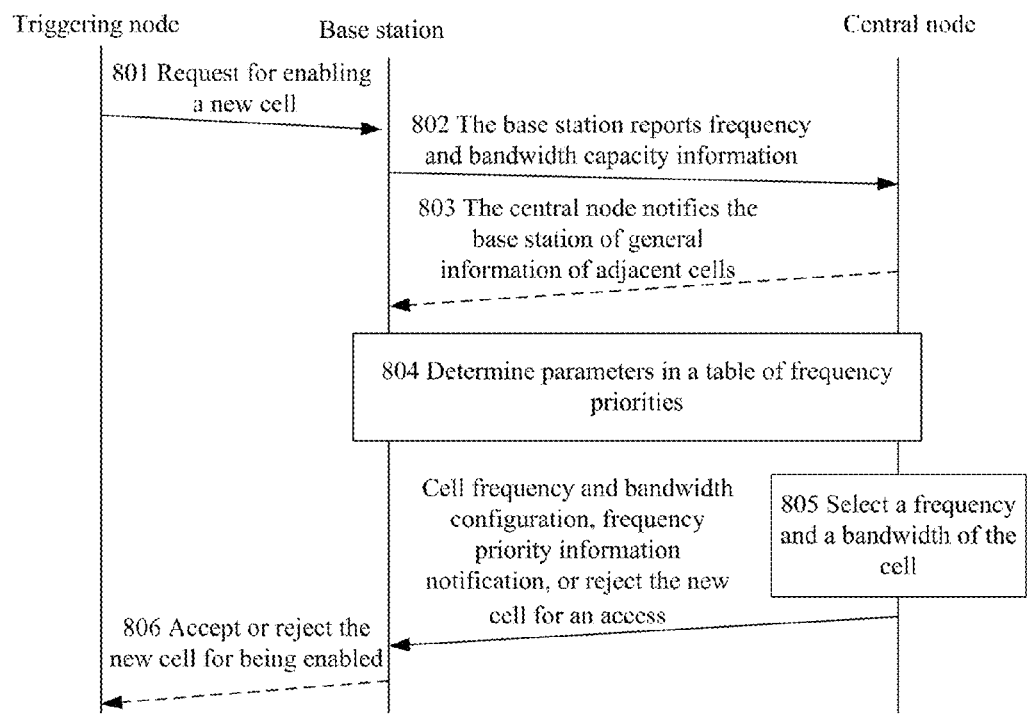
FIG. 8 is a schematic diagram of a process of triggering by a triggering node allocation for frequency resources according to an embodiment of the invention.

Here as illustrated in FIG. 8, the triggering node triggers the base station to enable a new cell particularly as follows:

Step 801: The triggering node transmits a request message to the base station to request for enabling a new cell, and in a particular implementation, the request message can include only a 1-bit enabling request, or can further include other information, e.g., cell positional information, coverage information, information about the amount of data, bandwidth demand information, etc.;

Step 802: The base station sets up a connection with a network, and reports frequency and bandwidth capacity information to the central node;

Step 803: Optionally if the central node can determine general information about adjacent cells of the newly enabled cell, then the central node will notify the base station of the general information of the adjacent cells, where the general information generally includes frequency information;

Step 804: The central node determines and maintains frequency priority parameters in a table of frequency priorities for a cluster of cells where the base station resides, or for the cells enabled by the base station, where the frequency priority parameters can be determined in the same way that the frequency priority parameters are determined in the first particular embodiment, so a repeated description thereof will be omitted here;

Step 805: The central node searches for and allocates an available band for the newly enabled cell according to the respective priority coefficients in the table of frequency priorities, configures the newly enabled cell with a frequency and a bandwidth, and notifies the base station of the table of frequency priorities, information about the adjacent cells, and other reference information of the newly enabled cell;

If no available band is located, then the central node will reply to the base station with a message that the newly enabled cell is rejected for an access; and Step 806: Optionally the central node feeds a message back to the triggering node that the newly enabled cell is enabled successfully, in response to a notification returned by the central node that the newly enabled cell is configured with a frequency resource; or the base station feeds a message back to the triggering node that the newly enabled cell is rejected for an access, in response to a message returned by the central node that the newly enabled cell is rejected for an access.

If the central node rejects the newly enabled cell for being configured with a frequency resource, then the triggering node or the base station will set a timer, and reinitiate an access request after a preset interval of time.

Figure 9:
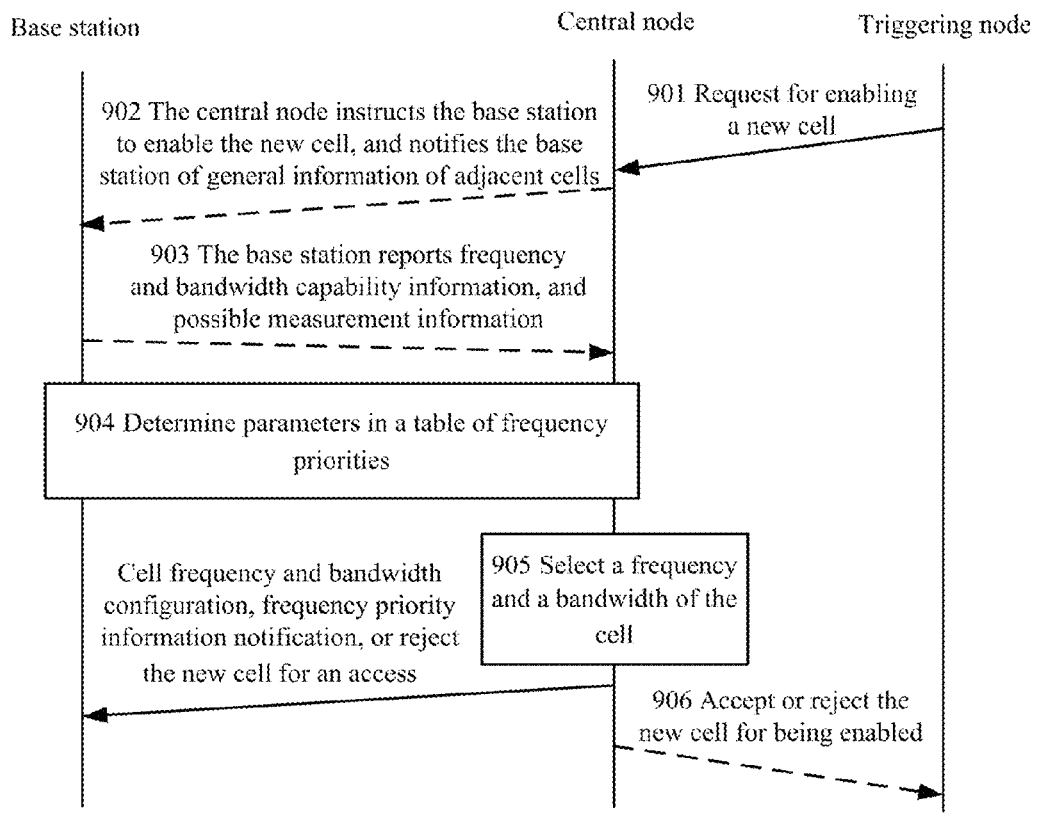
FIG. 9 is a schematic diagram of a process of triggering by a triggering node allocation for frequency resources for a central node according to an embodiment of the invention.

Here as illustrated in FIG. 9, the triggering node triggers the central node to enable a new cell particularly as follows:

Step 901: The triggering node transmits a request message to the central node to request for enabling a new cell, where the request message can include only a 1-bit enabling request, or can further include other information, e.g., cell positional information, coverage information, information about the amount of data, bandwidth demand information, etc.;

The step 902 to the step 904 can be performed in the same processes as the step 701 to the step 703 in the second particular embodiment, so a repeated description thereof will be omitted here.

Step 905: The central node searches for and allocates an available band for the newly enabled cell according to the respective priority coefficients in the table of frequency priorities, configures the newly enabled cell with a frequency and a bandwidth, and notifies the base station of the table of frequency priorities, information about the adjacent cells, and other reference information of the newly enabled cell;

If no available band is located, then the central node will reply to the base station with a message that the newly enabled cell is rejected for an access; and Step 906: Optionally the central node feeds a message back to the triggering node that the newly enabled cell is enabled successfully, or the central node feeds a message back to the base station that the newly enabled cell is rejected for an access.

If the central node rejects the newly enabled cell for being configured with a frequency resource, then the triggering node will set a timer, and reinitiate an access request after a preset interval of time.

Figure 10:
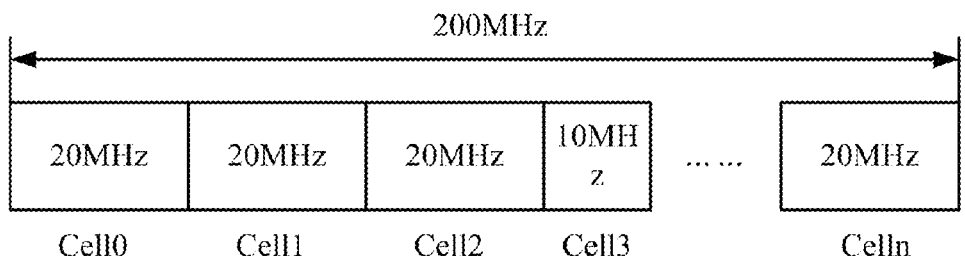
FIG. 10 is a schematic diagram of an effect of allocating orthogonal frequency resources for different cells according to an embodiment of the invention.

In a fourth particular embodiment, the central node allocates totally orthogonal frequency resources for different cells, that is, frequency resources accessed in a cluster of cells or by adjacent cells are totally different from a frequency resource allocated for a newly accessing cell, that is, the frequency resource do not overlap, as illustrated in FIG. 10, particularly as follows:

If the newly accessing cell (i.e., the cell for which a frequency resource is to be allocated, or the newly enabled cell in the respective particular embodiments above) is cell1.

In the first step, the central node calculates single-frequency priority coefficients in an elementary frequency resource according to interference of adjacent cells to the newly accessing cell, particularly by calculating interference of the adjacent cells to the newly accessing cell in the elementary frequency resource as the single-frequency priority coefficient of the adjacent cell to the newly accessing cell in the equation of:

$$i_{celln\text{-}cell1} = \text{cell interference of cell}n \text{ to cell1} \quad \text{(Equation 3)}$$

Equation 1 has been simplified into Equation 3, that is, $a_1=0$ and $a_2=1$, in Equation 1 above.

A frequency priority coefficient $I_{Rseg}$ of cell1 in each elementary frequency resource is the sum of the single-frequency priority coefficients of the respective adjacent cells in the equation of:

$$I_{Rseg} = \Sigma i_{celln\text{-}cell1} \quad \text{(Equation 4)}$$

Equation 2 has been simplified into. Equation 4, that is, $\beta_n=1$, in Equation 2 above.

In the second step, the central node sorts respective allowable operating bandwidths of the newly accessing cell in a descending order as Band0~Bandk;

In the third step, starting with the largest allowable operating bandwidth Band0 being the current allowable operating bandwidth, the central node searches all the possible central frequencies one by one for an available band starting with central frequencies of allowable operating bands of the newly accessing cell satisfying the current allowable operating bandwidth, and if an available band is located, then the search will be terminated, and the central node will determine the available band as a band to be allocated for cell1.

Here the available band is such that the frequency priority coefficients $I_{Rseg}$ of all the elementary frequency resources occupied by the current allowable operating bandwidth satisfy $I_{Rseg} \leq Th_{Rseg}$ at some central frequency, where $Th_{Rseg}$ represents a preset first available frequency priority coefficient threshold. $Th_{Rseg}$ is preset to the smallest value of interference which can be indicated.

In the fourth step, if there is no available band in the current allowable operating bandwidth Band0, then a next allowable operating bandwidth Band1 will be selected in the descending order to replace the current allowable operating bandwidth, and the searching process in the third step will be repeated to search for an available band until an available band is located, and the search will be terminated, or until the smallest allowable operating bandwidth Bandk is determined as the current allowable operating bandwidth, and the searching process in the third step is terminated while determining that there is no available band; and In the fifth step, if an available band is located, then the central node will configure the newly accessing cell with the available band including a central frequency and a bandwidth resource.

In this particular embodiment, different cells can be further allocated totally orthogonal frequency resources in a simplified manner particularly as follows:

In the first step, the central node calculates the frequency priority coefficient $I_{Rseg}$ of cell1 in each elementary frequency resource particularly as follows: if the elementary frequency resource is not occupied by the adjacent cells, then the frequency priority coefficient of the elementary frequency resource will be 0; and if the elementary frequency resource is occupied by the adjacent cells, then the frequency priority coefficient of the elementary frequency resource will be 1;

In the second step, the central node sorts the respective allowable operating bandwidths of the newly accessing cell in a descending order as Band0~Bandk;

In the third step, starting with the largest allowable operating bandwidth Band0 being the current allowable operating bandwidth, the central node searches all the possible central frequencies one by one for an available band starting with the central frequencies of the allowable operating bands of the cell satisfying the current allowable operating bandwidth, and if an available band is located, then the search will be terminated, and the central node will determine the available band as a band to be allocated for cell1.

Here the available band is such that the frequency priority coefficients $I_{Rseg}$ of all the elementary frequency resources occupied by the current allowable operating bandwidth satisfy $I_{Rseg}=0$ at some central frequency.

In the fourth step, if there is no available band in the current allowable operating bandwidth Band0, then a next allowable operating bandwidth Band1 will be selected in the descending order to replace the current allowable operating bandwidth Band0, and the searching process in the third step will be repeated to search for an available band until an available band is located, and the search will be terminated, or until the smallest allowable operating bandwidth Bandk is determined as the current allowable operating bandwidth, and the searching process in the third step is terminated while determining that there is no available band; and In the fifth step, if an available band is located, then the central node will configure the newly accessing cell with the available band including a central frequency and a bandwidth resource.

In this particular embodiment, if the central node configures a number of cells with frequency resources concurrently, then the central node will search for each newly accessing cell for all the available bands of the newly accessing cell; and allocate frequency resources collectively for the respective newly accessing cells according to all the available bands of the respective newly accessing cells.

Where all the available bands of each newly accessing cell are searched for as follows:

For each allowable operating bandwidth, starting with central frequencies of allowable operating bands satisfying the allowable operating bandwidth, all the possible central frequencies are traversed for an available band, and the available band is stored until the respective allowable operating bandwidths are traversed. In this process, available frequencies corresponding to the respective allowable operating bandwidths can be searched one by one in a descending order of the respective allowable operating bandwidths; or available frequencies corresponding to the respective allowable operating bandwidths can be searched in any order.

For example, if there are two available bands including Band1 and Band2 of a newly accessed cell AP1, and an available band Band2 of a newly accessing cell AP2, then the central node will allocate Band1 for AP1, and Band2 for AP2 for the purpose of the largest number of newly accessing cells allocated with frequency resources.

Figure 11:
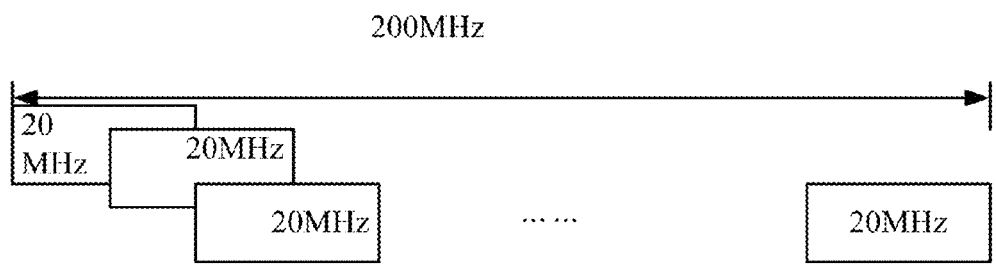
FIG. 11 is a schematic diagram of an effect of allocating frequency resources with non-overlapping central frequencies for different cells according to an embodiment of the invention.

In a fifth particular embodiment, a central node allocates frequency resources with non-overlapping central frequencies for different cells so that signals in bands around a central frequency of a cell will not interfere with each other (e.g., a 1.4 MHz bandwidth around a central frequency in the LTE system), that is, a broadcast message and primary signaling will not interference with each other, as illustrated in FIG. 11, particularly as follows:

In the first step, the central node calculates frequency priority coefficients of respective elementary frequency resources in Equation 1 and Equation 2 above;

In the second step, the central node sorts respective allowable operating bandwidths of a newly accessing cell in a descending order as Band0 to Bandk;

In the third step, starting with the largest allowable operating bandwidth Band0 being the current allowable operating bandwidth, the central node searches all the possible central frequencies for one by one for an absolutely available band starting with central frequencies of allowable operating bands of the cell satisfying the current allowable operating bandwidth;

The absolutely available band is such that the frequency priority coefficients $I_{Rseg}$ of the respective elementary frequency resources in the allowable operating bands are less than or equal to a preset first absolutely available frequency priority coefficient threshold $Th_{Rseg0}$, and/or frequency priority coefficients $I_{Band}$ of the allowable operating bands are less than or equal to a preset second absolutely available frequency priority coefficient threshold $Th_0$;

If an absolutely available band is located; then the search will be terminated, and the absolutely available band will be determined as a band to be allocated for cell1;

In the fourth step, if there is no absolutely available hand in the current allowable operating bandwidth Band0, then a next allowable operating bandwidth Band1 will be selected in the descending order to replace the current allowable operating bandwidth Band0 and the searching process in the third step will be repeated to search for an absolutely available band until an absolutely available band is located, and the search will be terminated, or until the smallest allowable operating bandwidth Bandk is determined as the current allowable operating bandwidth, and the searching process in the third step is terminated while determining that there is no absolutely available band; and In the fifth step, if no absolutely available band is located, then for each allowable operating bandwidth, respective allowable operating bands satisfying the optional operating bandwidth, of the cell will be searched for respective available bands, and the available bands will be stored until the respective allowable operating bandwidths are traversed, where the available bands are stored including central frequencies, bandwidths, respective $I_{Rseg}$, and respective $I_{Band}$ of the available bands;

The available bands are such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$;

Where $I_{Band}$ represents a result of weighted integrating the frequency priority coefficients of all the elementary frequency resources in the bandwidth, and particularly $I_{Band} = \text{mean}(\gamma^* I_{Rseg}) + P_{fcenter}$, where $\text{mean}(\gamma^* I_{Rseg})$ represents the weighted average of the frequency priority coefficients $I_{Rseg}$ of the respective elementary frequency resources in the allowable operating band, $\gamma$ represents a weight, and $P_{fcenter}$ represents a factor reflecting an overlapping condition of a central frequency of the allowable operating band;

If the central frequency of the allowable operating band is accessed by any one of the adjacent cells, then $P_{fcenter}$ will be infinite; and If the central frequency of the allowable operating band is not accessed by any one of the adjacent cells, then $P_{fcenter}$ will be 0;

Particularly if only the frequency priority coefficient $I_{Band}$ of the allowable operating band is taken into account, then $Th_{Rseg}$ will be set infinitive;

Particularly $Th_0 = Th_{Band}$ and $Th_{Rseg0} = Th_{Rseg}$ and are set, where only an absolutely available band is searched for without distinguishing an absolutely available band from an available band, and if an absolutely available band is located, then the search will be terminated, and the absolutely available band will be allocated for the newly accessing cell; and if all the allowable operating bandwidths are traversed without locating any absolutely available band, then no available band will be further searched for;

In the sixth step, one of the available bands is selected according to the bandwidths of the stored respective available bands, and the frequency priority coefficients $I_{Band}$ of the available bands, by selecting an available band with the smallest $I_{Band}$ given the same bandwidth, or an available band with a larger bandwidth given approximate $I_{Band}$;

In a particular implementation, for each allowable operating bandwidth, the smallest one of the frequency priority coefficients $I_{Band}$ of the respective available bands satisfying the allowable operating bandwidth is determined, and the available band corresponding to the smallest frequency priority coefficient is selected;

A coefficient of each selected available band is calculated, where the coefficient is the product of the bandwidth of the available band, and the frequency priority coefficient $I_{Band}$ of the available band, and an offset $\text{offset}_{Band}$ corresponding to the bandwidth of the available band;

The available band corresponding to the largest one of the coefficients is selected.

In the seventh step, the selected available band is allocated for the newly accessing cell including a central frequency and a bandwidth resource.

In this particular embodiment, if the central node configures a number of cells with frequency resources concurrently, then the central node will search for each newly accessing cell for all the available bands of the newly accessing cell; and allocate frequency resources collectively for the respective newly accessing cells according to all the available bands of the respective newly accessing cells.

The frequency resources are allocated collectively for the respective newly accessing cells so that larger bandwidths are allocated for the newly accessing cells, or the largest number of newly accessing cells can be accessed allocated with frequency resources.

For example, if bands band1 and band2 are adjacent, and for a cell AP1, then $I_{Band1} = 0.3$ and $I_{Band2} = 0.6$, then $I_{(Band1+Band2)} = 0.45$, where either or both band1 and band2 can be allocated for the cell AP1 for an operating band/or bands; and for a cell AP2, only band2 can be an available band. As per a frequency bandwidth configuration strategy, if an AP is allocated a bandwidth as large as possible, then the central node will allocate both band1 and band2 for the AP1, and recalculate frequency priority coefficients for AP2 after AP1 accesses, Where AP2 may not be allocated any frequency resource for operating; and if the largest number of newly accessing cells are allocated bandwidths, then the central node will allocate Band1 for AP1, and band2 for AP2.

In a sixth particular embodiment, a central node allocates frequency resources with the lowest interference and/or load for different cells, and in this particular embodiment, newly accessing cells are allocated frequency resources so that there is the lowest interference in a bandwidth, without taking into account their central frequencies.

For example, if the width of an elementary frequency resource is 2.5 MHz, a newly accessing cell is allocated a bandwidth resource of 5 MHz, frequency priority coefficients of elementary frequency resources Rseg1, Rseg2, and Rseg3 are IRseg1=0.2, IRseg2=0.2, and IRseg3=0.3 respectively, and a band resource of Rseg1 and Rseg2, and a band resource of Rseg2 and Rseg3 are accessed by adjacent cells, then the newly accessing cell will be allocated the band resource of Rseg1 and Rseg2 so that there is the lowest interference and/or load, without taking into account overlapping central frequencies.

In this particular embodiment, if the newly accessing cell is cell1, then:

In the first step, the central node calculates a single-cell frequency priority coefficient of an adjacent cell celln to the newly accessing cell cell1 in an elementary frequency resource in Equation 1 above, and a frequency priority coefficient in the elementary frequency resource in Equation 2 above;

In the second step, the central node sorts respective allowable operating bandwidths of the newly accessing cell in a descending order as Band0 to Bandk;

In the third step, starting with the largest allowable operating bandwidth Band0 being the current allowable operating bandwidth, the central node searches all the possible central frequencies one by one for an absolutely available band starting with central frequencies of allowable operating bands of the cell satisfying the current allowable operating bandwidth;

The absolutely available band is such that the frequency priority coefficients $I_{Rseg}$ of the respective elementary frequency resources in the allowable operating bands are less than or equal to a preset first absolutely available frequency priority coefficient threshold $Th_{Rseg0}$, and/or frequency priority coefficients $I_{Band}$ of the allowable operating bands are less than or equal to a preset second absolutely available frequency priority coefficient threshold $Th_0$;

If an absolutely available band is located, then the search will be terminated, and the absolutely available band will be determined as a band to be allocated for cell1;

In the fourth step; if there is no absolutely available band in the current allowable operating bandwidth Band0, then a next allowable operating bandwidth Band1 will be selected in the descending order to replace the current allowable operating bandwidth Band0, and the searching process in the third step will be repeated to search for an absolutely available band until an absolutely available hand is located, and the search will be terminated, or until the smallest allowable operating bandwidth Bandk is determined as the current allowable operating bandwidth, and the searching process in the third step is terminated while determining that there is no absolutely available band;

In the fifth step, if no absolutely available band is located, then for each allowable operating bandwidth, respective allowable operating bands satisfying the optional operating bandwidth, of the cell will be searched for respective available bands, and the available bands will be stored until the respective allowable operating bandwidths are traversed, where the available bands are stored including central frequencies, bandwidths, respective $I_{Rseg}$, and respective $I_{Band}$ of the available bands.

The available bands are such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$;

Particularly if only the frequency priority coefficient $I_{Band}$ of the allowable operating band is taken into account, then $Th_{Rseg}$ will be set infinitive;

Where $I_{Band}$ represents a result of weighted integrating the frequency priority coefficients of all the elementary frequency resources in the bandwidth, and in a simplified scheme, $I_{Band}$ takes the weighted average of the frequency priority coefficients of all the elementary frequency resources in the bandwidth, and is represented in the equation of $I_{Band}=\text{mean}(\gamma^* I_{Rseg})$.

Particularly $Th_0=Th_{Band}$ and $Th_{Rseg0}=Th_{Rseg}$ are set, where only an absolutely available band is searched for without distinguishing an absolutely available band from an available band, and if an absolutely available band is located; then the search will be terminated, and the absolutely available band will be allocated for the newly accessing cell; and if all the allowable operating bandwidths are traversed without locating any absolutely available band, then no available band will be further searched for;

In the sixth step, one of the available bands is selected according to the bandwidths of the stored respective available bands, and the frequency priority coefficients $I_{Band}$ of the available bands, by selecting an available band with the smallest $I_{Band}$ given the same bandwidth, or an available band with a larger bandwidth given approximate $I_{Band}$;

In a particular implementation, for each allowable operating bandwidth, the smallest one of the frequency priority coefficients $I_{Band}$ of the respective available bands satisfying the allowable operating bandwidth is determined, and the available band corresponding to the smallest frequency priority coefficient is selected;

A coefficient of each selected available band is calculated, where the coefficient is the product of the bandwidth of the available band, and the frequency priority coefficient $I_{Band}$ of the available band, and an offset $\text{offset}_{Band}$ corresponding to the bandwidth of the available band;

The available band corresponding to the largest one of the coefficients is selected;

In the seventh step, the selected available band is allocated for the newly accessing cell including a central frequency and a bandwidth resource.

In a seventh particular embodiment as opposite to the particular embodiments above where an available band is determined by setting a threshold, an available band is determined without setting any threshold in this embodiment of the invention under such a general idea that respective frequency priority coefficients in an allowable operating band of a base station are sorted, and an available band to be allocated for a newly accessing cell is selected.

A central node can allocate a frequency resource for a cell in the following two schemes:

In a first scheme, the central node allocates different cells available frequency resources with their central frequencies which do not overlap; and In a second scheme, the central node allocates different cells frequency resources with the lowest interference and/or load without taking into account overlapping central frequencies.

In this particular embodiment, if the newly accessing cell is cell1, then:

A particular process of the first scheme is as follows:

In the first step, the central node calculates single-cell frequency priority coefficients in an elementary frequency resource in Equation 1 above, and a frequency priority coefficient in the elementary frequency resource in Equation 2 above:

In the second step, for each allowable operating bandwidth, the central node traverses all the possible central frequencies starting with central frequencies of allowable operating bands of the cell satisfying the allowable operating bandwidth, and calculates frequency priority coefficients $I_{Band}$ of the allowable operating bands, where $I_{Band}$ represents a result of weighted integrating the frequency priority coefficients of all the elementary frequency resources in the bandwidth;

In a simplified scheme, $I_{Band}$ takes the weighted average the frequency priority coefficients of all the elementary frequency resources in the bandwidth, for example, $I_{Band}=\text{mean}(\gamma^* I_{Rseg})+P_{fcenter}$, where the factor $P_{fcenter}$ reflects an overlapping condition of a central frequency, where if the currently located central frequency is accessed by an adjacent cell, then $P_{fcenter}$ will take the largest value, e.g., be infinite: otherwise, $P_{fcenter}=0$;

Optionally before the respective allowable operating bandwidths are traversed, and respective $I_{Band}$ corresponding to the respective allowable operating bandwidths are calculated, the respective allowable operating bandwidths of the newly accessing cell are sorted in a descending order as Band0 to Bandk, so that the respective allowable operating bandwidths are traversed and respective $I_{Band}$ are calculated sequentially starting with the largest allowable operating bandwidth Band0;

$I_{Band}$ alternatively be calculated in the second step 2 in such a simplified scheme that if the current central frequency is not accessed by any adjacent cell, then $I_{Band}=\text{mean}(\gamma^* I_{Rseg})$; and if the current central frequency is accessed by an adjacent cell, then $I_{Band}$ will take NaN or be infinite or take another value apparently to be precluded;

The central node stores information about all the allowable operating bands from Band0 to Bandk including central frequencies, bandwidths, respective $I_{Rseg}$ and respective $I_{Band}$;

In the third step; the central node sorts $I_{Band}$ of the allowable operating bands and taking into account both the bandwidth and frequency priority information, the central node preferentially selects a band with the smallest $I_{Band}$ given the same bandwidth, or preferentially selects a band with the largest bandwidth given the difference between respective $I_{Band}$ lying in a preset range (that is, approximate $I_{Band}$), as an available band.

They can be calculated particularly as follows:

For each allowable operating bandwidth, the smallest one of the frequency priority coefficients $I_{Band}$ of the respective allowable operating bands satisfying the allowable operating bandwidth is determined, and the allowable operating band corresponding to the smallest frequency priority coefficient is selected;

A coefficient of each selected allowable operating band is calculated, where the coefficient is the product of the allowable operating bandwidth of the allowable operating band, and the frequency priority coefficient $I_{Band}$ of the allowable operating band; and an offset $\text{offset}_{Band}$ corresponding to the allowable operating bandwidth of the allowable operating band; and The allowable operating band corresponding to the largest one of the coefficients is determined, and the determined allowable operating band is determined as an available band; and In the fourth step, the central node configures the newly accessing cell cell1 with the available band including a central frequency and a bandwidth resource.

A particular process of the second scheme is the same as the particular process of the first scheme except that the frequency priority coefficients $I_{Band}$ of the respective allowable operating bands are calculated in the third step without taking into account overlapping central frequencies, where in a simplified scheme, $I_{Band}$ takes the weighted average of the frequency priority coefficients of all the elementary frequency resources in the bandwidth without taking into account the factor $P_{fcenter}$ reflecting an overlapping condition of a central frequency, and is represented in the equation of $I_{Band} = \text{mean}(\gamma * I_{Rseg})$.

Figure 12:
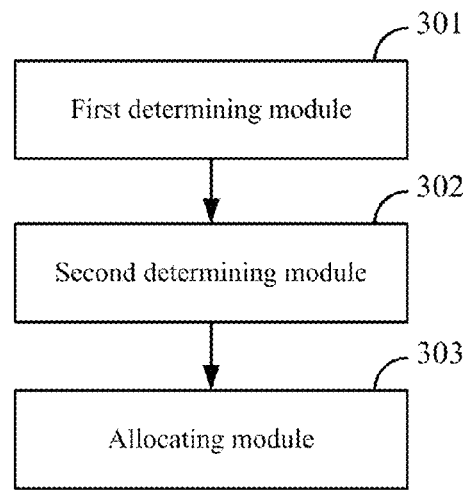
FIG. 12 is a schematic diagram of a network device according to an embodiment of the invention.

Based upon the same principle, an embodiment of the invention further provides a network device, and reference can be made to the particular implementation of the central node in the method above for a particular implementation of the network device, so a repeated description thereof will be omitted here and the network device can be deployed in reality a gateway (GW) or a core network node or an Operation, Administration and Maintenance (OAM) entity or another higher-layer network node, or can be a super base station. As illustrated in FIG. 12, the network device generally includes:

A first determining module 1201 is configured to determine respective elementary frequency resources in respective allowable operating bands of a cell satisfying an optional operating bandwidth;

A second determining module 1202 is configured to determine a frequency priority coefficient of each elementary frequency resource, where the frequency priority coefficient characterizes interference for the cell, from respective adjacent cells adjacent in position to the cell in the elementary frequency resource, and/or loads of the respective adjacent cells in the elementary frequency resource; and An allocating module 1203 is configured to allocate a frequency resource for the cell according to the frequency priority coefficients of the elementary frequency resources.

Preferably the second determining module is configured:

To determine the interference to the cell from the respective adjacent cells in the elementary frequency resource, and/or the loads of the adjacent cells in the elementary frequency resource and To calculate single-cell frequency priority coefficients of the respective adjacent cells for the cell according to the interference to the cell from the adjacent cells in the elementary frequency resource, and/or the loads of the adjacent cells in the elementary frequency resource, and to calculate the frequency priority coefficient of the elementary frequency resource according to the single-cell frequency priority coefficients of the respective adjacent cells for the cell.

Particularly there are the following two implementations:

In a first particular implementation, the second determining module is configured:

For each adjacent cell, to calculate the single-cell frequency priority coefficient of the adjacent cell for the cell as the sum of the product of a first weight factor and the load of the adjacent cell in the elementary frequency resource, and the product of a second weight factor and the interference to the cell from the adjacent cell in the elementary frequency resource; and To calculate the frequency priority coefficient $I_{Rseg}$ of the elementary frequency resource as the weighted sum of the single-cell frequency priority coefficients of the respective adjacent cells for the cell.

In a second particular implementation, the second determining module is configured:

To determine the interference to the cell of the adjacent cells in the elementary frequency resource as the single-cell frequency priority coefficients of the adjacent cells for the cell; and To calculate the frequency priority coefficient $I_{Rseg}$ of the elementary frequency resource as the sum of the single-cell frequency priority coefficient of the respective adjacent cells.

Preferably in this second particular embodiment, the second determining module is configured:

If the elementary frequency resource is not accessed by any one of the adjacent cells, to determine the frequency priority coefficient of the elementary frequency resource as 0; and If the elementary frequency resource is accessed by any one of the adjacent cells, to determine the frequency priority coefficient of the elementary frequency resource as 1.

Preferably the second determining module is configured:

To determine the positions of the adjacent cells according to positional information of a base station, and to determine the interference of the adjacent cells to the cell according to the position, and frequency resources of the adjacent cells;

Or

To receive the interference of the adjacent cells to the cell, reported by abuse station, which is determined by the base station measuring the interference of the adjacent cells;

Or

To determine the interference of the adjacent cells, stored in a history record of the cell being enabled in the past, which is measured by a terminal or a base station as the interference of the adjacent cells to the cell.

Furthermore the second determining module is further configured:

To calculate frequency priority coefficients $I_{Band}$ of the respective allowable operating bands of the cell satisfying the optional operating band according to the frequency priority coefficients $I_{Rseg}$ of the elementary frequency resources.

Preferably the allocating module is configured:

To allocate for the cell a frequency resource orthogonal to frequency resources of the respective adjacent cells according to the frequency priority coefficients of the elementary frequency resources;

Or the allocating module is configured:

To allocate for the cell a frequency resource with a central frequency which does not overlap with central frequencies of frequency resources of the respective adjacent cells according to the frequency priority coefficients of the elementary frequency resources;

Or

To allocate for the cell a frequency resource with the lowest interference and/or the lowest load of the allocated frequency resource according to the frequency priority coefficients of the elementary frequency resources.

In an embodiment of the invention, the allocating module can allocate a frequency resource for the cell in the following several particular implementations:

In a first particular implementation, the allocating module is configured:

To search the respective allowable operating bands satisfying the optional operating bandwidth, of the cell one by one for an absolutely available band, and if an absolutely available band is located, to allocate the absolutely available band for the cell;

Where the absolutely available band is such that the frequency priority coefficients $I_{Rseg}$ of the respective elementary frequency resources in the allowable operating bands are less than or equal to a preset first absolutely available frequency priority coefficient threshold $Th_{Rseg0}$, and/or the frequency priority coefficients $I_{Band}$ of the allowable operating bands are less than or equal to a preset second absolutely available frequency priority coefficient threshold $Th_0$.

In a preferred implementation, the allocating module is further configured:

If no absolutely available band is located, to traverse and search the respective allowable operating bands satisfying the optional operating bandwidth, of the cell for respective available bands, to store the available bands, and to select and allocate one of the available bands for the cell according to central frequencies and bandwidths of the stored available bands;

Where the available bands are such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$.

In another preferred implementation, the allocating module is further configured:

If no absolutely available band is located, to search the respective allowable operating bands satisfying the optional operating bandwidth, of the cell one by one for an available band, and if an available band is located, to allocate the available band for the cell;

Where the available band is such that the frequency priority coefficients $I_{Rseg}$ of the respective elementary frequency resources in the allowable operating bands are less ti an or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$.

In a second particular implementation, the allocating module is further configured:

To search the respective allowable operating bands satisfying the optional operating bandwidth, of the cell one by one for an available band, and if an available band is located, to allocate the available band for the cell;

Where the available band is such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$.

Or the allocating module is further configured:

To traverse and search the respective allowable operating bands satisfying the optional operating bandwidth, of the cell for respective available bands, to store the available bands, and to select and allocate one of the available bands for the cell according to central frequencies and bandwidths of the stored available bands;

Where the available bands are such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$.

In a preferred implementation, the allocating module is further configured to select one the available bands according to the frequency priority coefficients $I_{Band}$ of the stored available bands particularly as follows:

The allocating module is configured:

To sort the frequency priority coefficients $I_{Band}$ of the stored respective available bands according to their magnitude; and To select the smallest one of the frequency priority coefficients $I_{Band}$ of the available bands, and to allocate the available band corresponding to the smallest frequency priority coefficient for the cell; or To determine such respective available bands that the differences between the frequency priority coefficients of those available bands and the smallest one of the frequency priority coefficients $I_{Band}$ of the available bands lie in a preset range, to select the available band with the largest operating band among the determined respective available bands, and to allocate the selected available band for the cell.

Preferably the allocating module is configured:

For each allowable operating bandwidth, to determine the smallest one of the frequency priority coefficients $I_{Band}$ of the respective available bands satisfying the allowable operating bandwidth, and to select the available band corresponding to the smallest frequency priority coefficient;

To calculate a coefficient of each selected available band, where the coefficient is the product of the allowable operating bandwidth of the available band, and the frequency priority coefficient $I_{Band}$ of the available band, and an offset $offset_{Band}$ corresponding to the allowable operating bandwidth of the available band; and To determine the available band corresponding to the largest one of the coefficients, and to allocate the determined available band for the cell.

In a third particular implementation, the allocating module is configured:

To sort the frequency priority coefficients $I_{Band}$ of the respective allowable operating bands of the cell satisfying the respective optional operating bandwidths according to their magnitude; and To select the smallest one of the frequency priority coefficients $I_{Band}$ of the respective allowable operating bands, and to allocate the allowable operating band corresponding to the smallest frequency priority coefficient for the cell; or To determine such allowable operating bands that the differences between the frequency priority coefficients of those allowable operating bands and the smallest one of the frequency priority coefficients $I_{Band}$ of the respective allowable operating bands lie in a preset range, to select the allowable operating band with the largest operating band among the determined respective allowable operating bands, and to allocate the selected allowable operating band for the cell.

Preferably the allocating module is configured:

For each allowable operating bandwidth, to determine the smallest one of the frequency priority coefficients $I_{Band}$ of the respective allowable operating bands satisfying the allowable operating bandwidth, and to select the allowable operating band corresponding to the smallest frequency priority coefficient;

To calculate a coefficient of each selected allowable operating band, where the coefficient is the product of the allowable operating bandwidth of the allowable operating band, and the frequency priority coefficient $I_{Band}$ of the allowable operating band, and an offset $offset_{Band}$ corresponding to the allowable operating bandwidth of the allowable operating band; and To determine the allowable operating band corresponding to the largest one of the coefficients, and to allocate the determined available band for the cell.

In a fourth particular implementation, in correspondence to the second particular implementation in which the frequency priority coefficients of the elementary frequency resources are calculated in the step 302, the allocating module is configured:

To search the respective allowable operating bands satisfying the optional operating bandwidth, of the cell one by one for such an allowable operating band that the frequency priority coefficient $I_{Rseg}$ of each elementary frequency resource thereof is less than or equal to a first available frequency priority coefficient threshold $Th_{Rseg}$, and if such an allowable operating band is located, to terminate the search, and to allocate the located allowable operating band for the cell, where the first available frequency priority coefficient threshold $Th_{Rseg}$ represents the smallest value of interference which can be indicated.

In a fifth particular implementation, in correspondence to the simplified manner in which the frequency priority coefficients of the elementary frequency resources are calculated in the step 302, the allocating module is configured:

To search the respective allowable operating bands satisfying the optional operating bandwidth, of the cell one by one for such an allowable operating band that the frequency priority coefficient $I_{Rseg}$ of each elementary frequency resource thereof is equal to 0, and if such an allowable operating band is located, to terminate the search, and to allocate the located allowable operating band for the cell.

In the fourth and fifth particular implementations above, the frequency resource allocated for the cell is orthogonal to the frequency resources of the respective adjacent cells, that is, the frequency resource allocated for the cell does not overlap with the frequency resources of the adjacent cells.

Preferably in the first to fifth particular implementations above, the allocating module is further configured:

If there are a number of optional operating bandwidths of the cell, to sort the respective optional operating bandwidths of the cell in a descending order, and to select one of the optional operating bandwidths in the descending order.

Preferably the first determining module is configured:

To divide the allowable operating bands satisfying the allowable operating bandwidths, of the cell into a number of elementary frequency resources in elementary units of frequency resources according to a preset correspondence relationship between the allowable operating bandwidths and the elementary units of frequency resources of the cell.

Preferably the first determining module is further configured:

To receive frequency and bandwidth capacity information transmitted by a base station after setting up a connection with a network, and to determine respective allowable operating bandwidths and the respective allowable operating bands of the cell enabled by the base station according to the frequency and bandwidth capacity information.

Preferably the first determining module is further configured:

To instruct a base station to enable the cell, to receive frequency and bandwidth capacity information transmitted by the base station, and to determine respective allowable operating bandwidths and the respective allowable operating bands of the cell enabled by the base station according to the frequency and bandwidth capacity information.

Preferably the allocating module is further configured:

To reject the cell for being allocated a frequency resource, and to return a message to a base station enabling the cell that the cell is rejected for an access.

Figure 13:
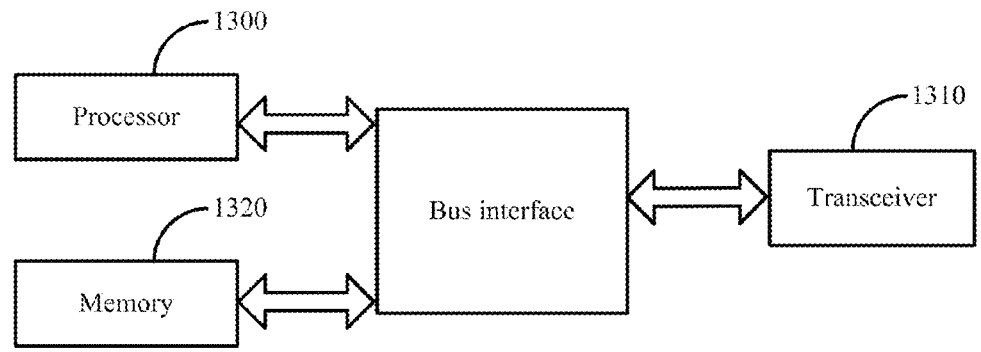
FIG. 13 is a schematic structural diagram of a network device according to an embodiment of the invention.

Based upon the same principle, an embodiment of the invention further provides a network device, and reference can be made to the particular implementation of the central node in the method above for a particular implementation of the network device, so a repeated description thereof will be omitted here; and the network device can be deployed in reality a gateway (GW) or a core network node or an OAM entity or another higher-layer network node, or can be a super base station. As illustrated in FIG. 13, the network device generally includes:

A processor 1300 is configured to read program in a memory 1320, and to perform the process of:

Determining respective elementary frequency resources in respective allowable operating bands of a cell satisfying an optional operating bandwidth;

Determining a frequency priority coefficient of each elementary frequency resource, where the frequency priority coefficient characterizes interference for the cell, from respective adjacent cells adjacent in position to the cell in the elementary frequency resource, and/or loads of the respective adjacent cells in the elementary frequency resource; and Allocating a frequency resource for the cell according to the frequency priority coefficients of the elementary frequency resources;

A transceiver 1310 is configured to be controlled by the processor 1300 to receive and transmit data; and A memory 1320 is configured to store data used by the processor 1300 in operation.

Here in FIG. 13, the bus architecture can include any number of interconnected buses and bridges and particularly link together one or more processors represented by the processor 1300, and one or more memories represented by the memory 1320. The bus architecture can further link together various other circuits, e.g., peripheral devices, a voltage stabilizer, a power management circuit, etc., and all these circuits are well known in the art, so a further description thereof will be omitted in this context. The bus interface serves as an interface. The transceiver 1310 can include a number of elements including a transmitter and a receiver serving as elements configured to communicate with various other devices over a transmission medium. The processor 1300 is responsible for managing the bus architecture and performing other normal processes, and the memory 1320 can store data used by the processor 1300 in operation.

Based upon the technical solutions above, in the embodiments of the invention, respective elementary frequency resources in allowable operating bands of a cell are determined, a frequency priority coefficient of each elementary frequency resource is determined, and a frequency resource is allocated for the cell according to the frequency priority coefficients of the elementary frequency resources, where the frequency resources are divided into the elementary frequency resources so that the frequency resources are planed collectively, and a frequency resource available to the cell served by the base station is determined according to the frequency priority coefficients of the respective elementary frequency resources, to thereby configure reasonably the frequency resources of the base station so as to avoid or alleviate inter-cell interference effectively.

With the technical solutions above, the frequency resources can be allocated reasonably between the base stations to thereby access the spectrum resources effectively so as to maximize the spectrum efficiency, Particularly in a scenario where the bases stations are deployed reasonably, the frequency resources of the base stations can be configured reasonably to thereby alleviate and even above inter-base station interference so as to improve the performance of wireless transmission, thus improving the capacity of the system. The embodiments of the invention are particularly applicable to a scenario where cells are deployed densely because the frequency resources of the base stations can be configured more efficiently and usefully in this scenario.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device on that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for configuring frequency resources of a base station, the method comprising:
   determining respective elementary frequency resources in respective allowable operating bands of a cell satisfying an optional operating bandwidth;
   determining a frequency priority coefficient of the respective elementary frequency resources, wherein the frequency priority coefficient characterizes interference for the cell, from respective adjacent cells adjacent in position to the cell in the respective elementary frequency resources, and/or loads of the respective adjacent cells in the respective elementary frequency resources; and
   allocating a frequency resource for the cell according to the frequency priority coefficients of the respective elementary frequency resources.

2. The method according to claim 1, wherein the determining the frequency priority coefficient of the respective elementary frequency resources comprises:
   determining the interference to the cell from the respective adjacent cells in the respective elementary frequency resources, and/or the loads of the adjacent cells in the respective elementary frequency resources; and
   calculating single-cell frequency priority coefficients of the respective adjacent cells for the cell according to the interference to the cell from the adjacent cells in the respective elementary frequency resources, and/or the loads of the adjacent cells in the respective elementary frequency resources, and calculating the frequency priority coefficient of the respective elementary frequency resources according to the single-cell frequency priority coefficients of the respective adjacent cells for the cell, wherein the single-cell frequency priority coefficient characterizes interference to the cell from a single adjacent cell in the respective elementary frequency resources, and/or a load of the single adjacent cell in the respective elementary frequency resources;

wherein the calculating the single-cell frequency priority coefficients of the respective adjacent cells for the cell, and calculating the frequency priority coefficient of the respective elementary frequency resources according to the single-cell frequency priority coefficients of the respective adjacent cells for the cell comprises:

for each adjacent cell, calculating the single-cell frequency priority coefficient of the adjacent cell for the cell as the sum of the product of a first weight factor and the load of the adjacent cell in the respective elementary frequency resources, and the product of a second weight factor and the interference to the cell from the adjacent cell in the respective elementary frequency resources; and calculating the frequency priority coefficient $I_{Rseg}$ of the respective elementary frequency resources as the weighted sum of the single-cell frequency priority coefficients of the respective adjacent cells for the cell; the Rseg is frequency resource;

wherein the sum of the first weight factor and the second weight factor is 1;

the interference to the cell from the adjacent cells in the respective elementary frequency resources is the ratios of interference measured values of the adjacent cells to the cell to the quantified largest interference value, wherein the interference measured values of the adjacent cells to the cell are measured strength values of Reference Signal Received Power (RSRP) or other reference signals of the adjacent cells measured in the cell; and the loads of the adjacent cells in the respective elementary frequency resources range from 0 to 1, wherein "0" indicates that none of resources of the adjacent cells is occupied, and "1" indicates that all the resources of the adjacent cells are occupied.

3. The method according to claim 2, wherein the determining the interference to the cell from each adjacent cells in the respective elementary frequency resources comprises:

determining, by a central node, the position of the adjacent cell according to positional information of the base station, and determining the interference of the adjacent cell to the cell according to the position, and frequency resources of the adjacent cell;

or receiving, by a central node, the interference of the adjacent cell to the cell, reported by the base station, which is determined by the base station measuring the interference of the adjacent cell;

or determining, by a central node, the interference of the adjacent cell, stored in a history record of the cell being enabled in the past, which is measured by a terminal or the base station as the interference of the adjacent cell to the cell.

4. The method according to claim 1, wherein the allocating a frequency resource for the cell according to the frequency priority coefficients of the respective elementary frequency resources comprises:

allocating a frequency resource for the cell according to the frequency priority coefficients of the respective elementary frequency resources so that the allocated frequency resource is orthogonal to frequency resources of the respective adjacent cells;

wherein the determining the frequency priority coefficient of the respective elementary frequency resources comprises:

determining the interference to the cell of the adjacent cells in the respective elementary frequency resources as the single-cell frequency priority coefficients of the adjacent cells for the cell; and calculating the frequency priority coefficient $I_{Rseg}$ of the respective elementary frequency resources as the sum of the single-cell frequency priority coefficient of the respective adjacent cells;

wherein the allocating a frequency resource for the cell according to the frequency priority coefficients of the respective elementary frequency resources comprises:

searching the respective allowable operating bands satisfying the optional operating bandwidth, of the cell one by one for such an allowable operating band that the frequency priority coefficient $I_{Rseg}$ of the respective elementary frequency resources thereof is less than or equal to a first available frequency priority coefficient threshold $Th_{Rseg}$, and if such an allowable operating band is located, then terminating the search, and allocating the located allowable operating band for the cell, wherein the first available frequency priority coefficient threshold $Th_{Rseg}$ represents the smallest value of interference which can be indicated;

wherein the determining the frequency priority coefficient of the respective elementary frequency resources comprises:

if the respective elementary frequency resources are not accessed by any one of the adjacent cells, then determining the frequency priority coefficient of the respective elementary frequency resources will as 0; and if the respective elementary frequency resources are accessed by any one of the adjacent cells, then determining the frequency priority coefficient of the respective elementary frequency resources as 1;

wherein the allocating a frequency resource for the cell according to the frequency priority coefficients of the respective elementary frequency resources comprises:

searching the respective allowable operating bands satisfying the optional operating bandwidth, of the cell one by one for such an allowable operating band that the frequency priority coefficient $I_{Rseg}$ of the respective elementary frequency resources thereof is equal to 0, and if such an allowable operating band is located, then terminating the search, and allocating the located allowable operating band for the cell.

5. The method according to claim 4, wherein before the respective allowable operating bands satisfying the optional operating bandwidth, of the cell are searched one by one, or before the respective allowable operating bands satisfying the optional operating bandwidth, of the cell are traversed, the method further comprises:

if there are a number of optional operating bandwidths of the cell, then sorting the respective optional operating bandwidths of the cell in a descending order, and then selecting one of the optional operating bandwidths in the descending order.

6. The method according to claim 4, wherein the method further comprises:

if frequency resources are allocated for a number of cells concurrently, then allocating frequency resources with larger bandwidths for the cells; or allocating frequency resources for the largest number of cells.

7. The method according to claim 1, wherein the allocating a frequency resource for the cell according to the frequency priority coefficients of the respective elementary frequency resources comprises:

allocating a frequency resource for the cell according to the frequency priority coefficients of the respective elementary frequency resources so that a central frequency of the allocated frequency resource does not overlap with central frequencies of frequency resources of the respective adjacent cells;

or allocating a frequency resource for the cell according to the frequency priority coefficients of the respective elementary frequency resources so that there is the lowest interference and/or the lowest load of the allocated frequency resource;

the method further comprises:

calculating frequency priority coefficients $I_{Band}$ of the respective allowable operating bands of the cell satisfying the optional operating band according to the frequency priority coefficients $I_{Rseg}$ of the respective elementary frequency resources;

wherein the allocating a frequency resource for the cell according to the frequency priority coefficients of the respective elementary frequency resources comprises:

searching the respective allowable operating bands satisfying the optional operating bandwidth, of the cell one by one for an absolutely available band, and if an absolutely available band is located, then allocating the absolutely available band for the cell;

wherein the absolutely available band is such that the frequency priority coefficients $I_{Rseg}$ of the respective elementary frequency resources in the allowable operating bands are less than or equal to a preset first absolutely available frequency priority coefficient threshold $Th_{Rseg0}$, and/or the frequency priority coefficients $I_{Band}$ of the allowable operating bands are less than or equal to a preset second absolutely available frequency priority coefficient threshold $Th_0$;

wherein if no absolutely available band is located, the method further comprises:

traversing and searching the respective allowable operating bands satisfying the optional operating bandwidth, of the cell for respective available bands, storing the available bands, and selecting and allocating one of the available bands for the cell according to central frequencies and bandwidths of the stored available bands;

wherein the available bands are such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$; or wherein if no absolutely available band is located, the method further comprises:

searching the respective allowable operating bands satisfying the optional operating bandwidth, of the cell one by one for an available band, and if an available band is located, then allocating the available band for the cell;

wherein the available band is such that the frequency priority coefficient $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$;

wherein if the cell is allocated with a frequency resource with the lowest interference and/or load, then the frequency priority coefficients $I_{Band}$ of the allowable operating bands will be $I_{Band}=\text{mean}(\gamma^*I_{Rseg})$, wherein $\text{mean}(\gamma^*I_{Rseg})$ represents the weighted averages of the frequency priority coefficients $I_{Rseg}$ of the respective elementary frequency resources in the allowable operating bands, and $\gamma$ represents a weight.

8. The method according to claim 7, wherein the allocating a frequency resource for the cell according to the frequency priority coefficients of the respective elementary frequency resources comprises:

searching the respective allowable operating bands satisfying the optional operating bandwidth, of the cell one by one for an available band, and if an available band is located, then allocating the available band for the cell;

wherein the available band is such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$; or wherein the allocating a frequency resource for the cell according to the frequency priority coefficients of the respective elementary frequency resources comprises:

traversing and searching the respective allowable operating bands satisfying the optional operating bandwidth, of the cell for respective available bands, storing the available bands, and selecting and allocating one of the available bands for the cell according to central frequencies and bandwidths of the stored available bands;

wherein the available bands are such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$; or wherein the allocating a frequency resource for the cell according to the frequency priority coefficients of the respective elementary frequency resources comprises:

sorting the frequency priority coefficients $I_{Band}$ of the respective allowable operating bands satisfying the optional operating bandwidth, of the cell according to their magnitude; and selecting the smallest one of the frequency priority coefficients $I_{Band}$ of the respective allowable operating bands, and allocating the allowable operating band corresponding to the smallest frequency priority coefficient for the cell; or determining such allowable operating bands that the differences between the frequency priority coefficients of those allowable operating bands and the smallest one of the frequency priority coefficients $I_{Band}$ of the respective allowable operating bands lie in a preset range, selecting the allowable operating band with the largest operating band among the determined respective allowable operating bands, and allocating the selected allowable operating band for the cell;

wherein the allocating a frequency resource for the cell according to the frequency priority coefficients of the respective elementary frequency resources comprises:

for each allowable operating bandwidth, determining the smallest one of the frequency priority coefficients $I_{Band}$ of the respective allowable operating bands satisfying the allowable operating bandwidth, and selecting the allowable operating band corresponding to the smallest frequency priority coefficient;

calculate a coefficient of each selected allowable operating band, wherein the coefficient is the product of the allowable operating bandwidth of the allowable operating band, and the frequency priority coefficient $I_{Band}$ of the allowable operating band, and an offset $offset_{Band}$ corresponding to the allowable operating bandwidth of the allowable operating band; and determining the allowable operating band corresponding to the largest one of the coefficients, and allocating the determined available band for the cell.

9. The method according to claim 7, wherein if the central frequency of the frequency resource allocated for the cell does not overlap with the central frequencies of the frequency resources of the respective adjacent cells, then the frequency priority coefficients $I_{Band}$ of the allowable operating bands will be $I_{Band}=\text{mean}(\gamma^*I_{Rseg})+P_{fcenter}$, wherein $\text{mean}(\gamma^*I_{Rseg})$ represents the weighted averages of the frequency priority coefficients $I_{Rseg}$ of the respective elementary frequency resources in the allowable operating bands, represents a weight, and $P_{fcenter}$ represents a factor reflecting overlapping conditions of central frequencies of the allowable operating bands;

wherein:
if the central frequencies of the allowable operating bands are accessed by any one of the adjacent cells, then $P_{fcenter}$ will be infinite; and
if the central frequencies of the allowable operating bands are not accessed by any one of the adjacent cells, then $P_{fcenter}$ will be 0.

10. The method according to claim 7, wherein the selecting and allocating one of the available bands for the cell according to the central frequencies and the bandwidths of the stored available bands comprises:

sorting the frequency priority coefficients $I_{Band}$ of the available bands according to their magnitude;

selecting the smallest one of the frequency priority coefficients $I_{Band}$ of the available bands, and allocating the available band corresponding to the smallest frequency priority coefficient for the cell; or determining such respective available bands that the differences between the frequency priority coefficients of those available bands and the smallest one of the frequency priority coefficients $I_{Band}$ of the available bands lie in a preset range, selecting the available band with the largest operating band among the determined respective available bands, and allocating the selected available band for the cell;

wherein the selecting and allocating one of the available bands for the cell according to the central frequencies and the bandwidths of the stored available bands comprises:

for each allowable operating bandwidth, determining the smallest one of the frequency priority coefficients $I_{Band}$ of the respective available bands satisfying the allowable operating bandwidth, and selecting the available band corresponding to the smallest frequency priority coefficient;

calculating a coefficient of each selected available band, wherein the coefficient is the product of the allowable operating bandwidth of the available band, and the frequency priority coefficient $I_{Band}$ of the available band, and an offset $offset_{Band}$ corresponding to the allowable operating bandwidth of the available band;

determining the available band corresponding to the largest one of the coefficients, and allocating the determined available band for the cell.

11. The method according to claim 1, wherein the determining the respective elementary frequency resources in the respective allowable operating bands satisfying the optional operating bandwidth, of the cell comprises:

dividing the allowable operating bands satisfying the allowable operating bandwidths, of the cell into a number of elementary frequency resources in elementary units of frequency resources according to a preset correspondence relationship between the allowable operating bandwidths and the elementary units of frequency resources of the cell;

the method further comprises:
receiving, by a central node, frequency and bandwidth capacity information transmitted by the base station after setting up a connection with a network, and determining respective allowable operating bandwidths and the respective allowable operating bands of the cell enabled by the base station according to the frequency and bandwidth capacity information;

wherein before the frequency and bandwidth capacity information transmitted by the base station after setting up the connection with the network is received, the method further comprises:

receiving, by the base station, a request message transmitted by a triggering node to request for enabling the cell;

the method further comprises:
instructing, by a central node, the base station to enable the cell, receiving frequency and bandwidth capacity information transmitted by the base station, and determining respective allowable operating bandwidths and the respective allowable operating bands of the cell enabled by the base station according to the frequency and bandwidth capacity information.

12. The method according to claim 1, further comprising:
rejecting, by a central node, the cell for being allocated a frequency resource, and returning a message to the base station enabling the cell that the cell is rejected for an access;

the method further comprises:
retransmitting, by the base station, a request for allocating a frequency resource for the cell to a central node after a preset length of time elapses.

13. A non-transitory computer-readable medium having instructions stored thereon which, when executed by a computer, cause the computer to determine respective elementary frequency resources in respective allowable operating bands of a cell satisfying an optional operating bandwidth;

determine a frequency priority coefficient of the respective elementary frequency resources, wherein the frequency priority coefficient characterizes interference for the cell, from respective adjacent cells adjacent in position to the cell in the elementary frequency resource, and/or loads of the respective adjacent cells in the respective elementary frequency resources;
allocate a frequency resource for the cell according to the frequency priority coefficients of the respective elementary frequency resources.

14. The non-transitory computer-readable medium according to claim 13, wherein the instructions when executed by the computer, further cause the computer to:
determine the interference to the cell from the respective adjacent cells in the respective elementary frequency resources, and/or the loads of the adjacent cells in the respective elementary frequency resources; and
calculate single-cell frequency priority coefficients of the respective adjacent cells for the cell according to the interference to the cell from the adjacent cells in the respective elementary frequency resources, and/or the loads of the adjacent cells in the respective elementary frequency resources, and calculate the frequency priority coefficient of the respective elementary frequency resources according to the single-cell frequency priority coefficients of the respective adjacent cells for the cell, wherein the single-cell frequency priority coefficient characterizes interference to the cell from a single adjacent cell in the respective elementary frequency resources, and/or a load of the single adjacent cell in the respective elementary frequency resources;
wherein the instructions when executed by the computer, further cause the computer to:
for each adjacent cell, calculate the single-cell frequency priority coefficient of the adjacent cell for the cell as the sum of the product of a first weight factor and the load of the adjacent cell in the respective elementary frequency resources, and the product of a second weight factor and the interference to the cell from the adjacent cell in the respective elementary frequency resources; and
calculate the frequency priority coefficient $I_{Rseg}$ of the respective elementary frequency resources as the weighted sum of the single-cell frequency priority coefficients of the respective adjacent cells for the cell; the Rseg is frequency resource.

15. The non-transitory computer-readable medium according to claim 14, wherein the instructions when executed by the computer, further cause the computer to:
determine the positions of the adjacent cells according to positional information of a base station, and determine the interference of the adjacent cells to the cell according to the position, and frequency resources of the adjacent cells;
or
receive the interference of the adjacent cells to the cell, reported by a base station, which is determined by the base station measuring the interference of the adjacent cells;
or
determine the interference of the adjacent cells, stored in a history record of the cell being enabled in the past, which is measured by a terminal or a base station as the interference of the adjacent cells to the cell.

16. The non-transitory computer-readable medium according to claim 13, wherein the instructions when executed by the computer, further cause the computer to:
allocate a frequency resource for the cell according to the frequency priority coefficients of the respective elementary frequency resources so that the allocated frequency resource is orthogonal to frequency resources of the respective adjacent cells;
wherein the instructions when executed by the computer, further cause the computer to:
determine the interference to the cell of the adjacent cells in the respective elementary frequency resources as the single-cell frequency priority coefficients of the adjacent cells for the cell; and
calculate the frequency priority coefficient $I_{Rseg}$ of the respective elementary frequency resources as the sum of the single-cell frequency priority coefficient of the respective adjacent cells;
wherein the instructions when executed by the computer, further cause the computer to:
search the respective allowable operating bands satisfying the optional operating bandwidth, of the cell one by one for such an allowable operating band that the frequency priority coefficient $I_{Rseg}$ of the respective elementary frequency resources thereof is less than or equal to a first available frequency priority coefficient threshold $Th_{Rseg}$, and if such an allowable operating band is located, to terminate the search, and allocate the located allowable operating band for the cell, wherein the first available frequency priority coefficient threshold $Th_{Rseg}$ represents the smallest value of interference which can be indicated; or
wherein the instructions when executed by the computer, further cause the computer to:
if the respective elementary frequency resources are not accessed by any one of the adjacent cells, determine the frequency priority coefficient of the respective elementary frequency resources will as 0; and
if the respective elementary frequency resources are accessed by any one of the adjacent cells, determine the frequency priority coefficient of the respective elementary frequency resources as 1;
wherein the instructions when executed by the computer, further cause the computer to:
search the respective allowable operating bands satisfying the optional operating bandwidth, of the cell one by one for such an allowable operating band that the frequency priority coefficient $I_{Rseg}$ of the respective elementary frequency resources thereof is equal to 0, and if such an allowable operating band is located, terminate the search, and allocate the located allowable operating band for the cell.

17. The non-transitory computer-readable medium according to claim 16, wherein the instructions when executed by the computer, further cause the computer to:
if there are a number of optional operating bandwidths of the cell, sort the respective optional operating bandwidths of the cell in a descending order, and select one of the optional operating bandwidths in the descending order.

18. The non-transitory computer-readable medium according to claim 13, wherein the instructions when executed by the computer, further cause the computer to:
allocate for the cell a frequency resource with a central frequency which does not overlap with central frequencies of frequency resources of the respective adjacent cells according to the frequency priority coefficients of the respective elementary frequency resources;
or
allocate for the cell a frequency resource with the lowest interference and/or the lowest load of the allocated frequency resource according to the frequency priority coefficients of the respective elementary frequency resources;

wherein the instructions when executed by the computer, further cause the computer to:

calculate frequency priority coefficients $I_{Band}$ of the respective allowable operating bands of the cell satisfying the optional operating band according to the frequency priority coefficients $I_{Rseg}$ of the respective elementary frequency resources;

wherein the instructions when executed by the computer, further cause the computer to:

search the respective allowable operating bands satisfying the optional operating bandwidth, of the cell one by one for an absolutely available band, and if an absolutely available band is located, allocate the absolutely available band for the cell;

wherein the absolutely available band is such that the frequency priority coefficients $I_{Rseg}$ of the respective elementary frequency resources in the allowable operating bands are less than or equal to a preset first absolutely available frequency priority coefficient threshold $Th_{Rseg0}$, and/or the frequency priority coefficients $I_{Band}$ of the allowable operating bands are less than or equal to a preset second absolutely available frequency priority coefficient threshold $Th_0$;

wherein the instructions when executed by the computer, further cause the computer to:

if no absolutely available band is located, traverse and search the respective allowable operating bands satisfying the optional operating bandwidth, of the cell for respective available bands, store the available bands, and select and allocate one of the available bands for the cell according to central frequencies and bandwidths of the stored available bands;

wherein the available bands are such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$;

wherein the instructions when executed by the computer, further cause the computer to:

if no absolutely available band is located, search the respective allowable operating bands satisfying the optional operating bandwidth, of the cell one by one for an available band, and if an available band is located, allocate the available band for the cell;

wherein the available band is such that the frequency priority coefficients $I_{Rseg}$ of the respective elementary frequency resources in the allowable operating bands are less than or equal to a preset first available frequency priority coefficient threshold $Th_{Rseg}$, and/or the frequency priority coefficients $I_{Band}$ of the allowable operating bands are less than or equal to a preset second available frequency priority coefficient threshold $Th_{Band}$; or wherein the instructions when executed by the computer, further cause the computer to:

sort the frequency priority coefficients $I_{Band}$ of the respective allowable operating bands of the cell satisfying the respective optional operating bandwidths according to their magnitude;

select the smallest one of the frequency priority coefficients $I_{Band}$ of the respective allowable operating bands, and allocate the allowable operating band corresponding to the smallest frequency priority coefficient for the cell; or determine such allowable operating bands that the differences between the frequency priority coefficients of those allowable operating bands and the smallest one of the frequency priority coefficients $I_{Band}$ of the respective allowable operating bands lie in a preset range, select the allowable operating band with the largest operating band among the determined respective allowable operating bands, and allocate the selected allowable operating band for the cell;

wherein the instructions when executed by the computer, further cause the computer to:

for each allowable operating bandwidth, determine the smallest one of the frequency priority coefficients $I_{Band}$ of the respective allowable operating bands satisfying the allowable operating bandwidth, and select the allowable operating band corresponding to the smallest frequency priority coefficient;

calculate a coefficient of each selected allowable operating band, wherein the coefficient is the product of the allowable operating bandwidth of the allowable operating band, and the frequency priority coefficient $I_{Band}$ of the allowable operating band, and an offset $offset_{Band}$ corresponding to the allowable operating bandwidth of the allowable operating band; and determine the allowable operating band corresponding to the largest one of the coefficients, and allocate the determined available band for the cell;

wherein the instructions when executed by the computer, further cause the computer to:

sort the frequency priority coefficients $I_{Band}$ of the stored respective available bands according to their magnitude; and select the smallest one of the frequency priority coefficients $I_{Band}$ of the available bands, and allocate the available band corresponding to the smallest frequency priority coefficient for the cell; or determine such respective available bands that the differences between the frequency priority coefficients of those available bands and the smallest one of the frequency priority coefficients $I_{Band}$ of the available bands lie in a preset range, select the available band with the largest operating band among the determined respective available bands, and allocate the selected available band for the cell;

wherein execution of the instructions by the at least one processor further causes the at least one processor to:

for each allowable operating bandwidth, determine the smallest one of the frequency priority coefficients $I_{Band}$ of the respective available bands satisfying the allowable operating bandwidth, and select the available band corresponding to the smallest frequency priority coefficient;

calculate a coefficient of each selected available band, wherein the coefficient is the product of the allowable operating bandwidth of the available band, and the frequency priority coefficient $I_{Band}$ of the available band, and an offset $offset_{Band}$ corresponding to the allowable operating bandwidth of the available band; and determine the available band corresponding to the largest one of the coefficients, and allocate the determined available band for the cell.

19. The network device according to claim 13, wherein the instructions when executed by the computer, further cause the computer to:
- divide the allowable operating bands satisfying the allowable operating bandwidths, of the cell into a number of elementary frequency resources in elementary units of frequency resources according to a preset correspondence relationship between the allowable operating bandwidths and the elementary units of frequency resources of the cell;
- wherein the instructions when executed by the computer, further cause the computer to:
- receive frequency and bandwidth capacity information transmitted by a base station after setting up a connection with a network, and determine respective allowable operating bandwidths and the respective allowable operating bands of the cell enabled by the base station according to the frequency and bandwidth capacity information;

wherein the instructions when executed by the computer, further cause the computer to:
- instruct a base station to enable the cell, receive frequency and bandwidth capacity information transmitted by the base station, and determine respective allowable operating bandwidths and the respective allowable operating bands of the cell enabled by the base station according to the frequency and bandwidth capacity information.

20. The non-transitory computer-readable medium according to claim 13, wherein the instructions when executed by the computer, further cause the computer to:
- reject the cell for being allocated a frequency resource, and return a message to a base station enabling the cell that the cell is rejected for an access.

* * * * *